United States Patent
Novlan et al.

(10) Patent No.: US 9,894,651 B2
(45) Date of Patent: Feb. 13, 2018

(54) METHODS AND APPARATUS FOR RESOURCE ALLOCATION FOR D2D COMMUNICATIONS

(71) Applicant: Samsung Electronics Co., Ltd., Gyeonggi-do (KR)

(72) Inventors: Thomas David Novlan, Dallas, TX (US); Boon Loong Ng, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 14/818,150

(22) Filed: Aug. 4, 2015

(65) Prior Publication Data

US 2016/0044665 A1 Feb. 11, 2016

Related U.S. Application Data

(60) Provisional application No. 62/055,409, filed on Sep. 25, 2014, provisional application No. 62/039,876, filed on Aug. 20, 2014, provisional application No. 62/035,302, filed on Aug. 8, 2014.

(51) Int. Cl.
  *H04J 3/00* (2006.01)
  *H04W 72/04* (2009.01)
  *H04W 76/02* (2009.01)

(52) U.S. Cl.
  CPC ... *H04W 72/0446* (2013.01); *H04W 72/0406* (2013.01); *H04W 76/023* (2013.01); *H04W 72/048* (2013.01)

(58) Field of Classification Search
  CPC ......... H04W 72/1289; H04W 72/0406; H04W 72/0413; H04W 72/042; H04W 72/12; H04W 72/1247; H04W 76/023; H04W 92/18; H04L 1/1822; H04L 1/1896
  USPC ........................................................ 370/336
  See application file for complete search history.

(56) References Cited

U.S. PATENT DOCUMENTS

| | | | |
|---|---|---|---|
| 2012/0275391 A1 | 11/2012 | Cui et al. | |
| 2013/0258996 A1* | 10/2013 | Jung ................. | H04W 72/1284 370/330 |
| 2013/0308551 A1* | 11/2013 | Madan .............. | H04W 72/0406 370/329 |
| 2013/0322413 A1* | 12/2013 | Pelletier ............ | H04W 72/1289 370/336 |

(Continued)

OTHER PUBLICATIONS

Huawei et al., "Scheduling Assignment Content for D2D", 3GPP TSG RAN WG1 Meeting #77, May 20, 2014, 5 pgs.

(Continued)

*Primary Examiner* — Wutchung Chu
*Assistant Examiner* — Berhanu Belete

(57) ABSTRACT

A user equipment, apparatus, and method are provided for wireless communication in a hybrid communication network. A method includes transmitting, by a first user equipment (UE), a scheduling request to a first eNodeB (eNB). The scheduling request indicates that the UE is capable of device-to-device (D2D) communications. The method includes receiving, by the first UE, a first scheduling assignment (SA) from the first eNB. The first SA indicates resources to be used by the first UE for device-to-device (D2D) communications with the first eNB. The method includes communicating, by the first UE, with the first eNB according to the first SA.

14 Claims, 13 Drawing Sheets

(56) References Cited

U.S. PATENT DOCUMENTS

| | | | | |
|---|---|---|---|---|
| 2014/0023008 A1* | 1/2014 | Ahn | ................... | H04W 76/023 370/329 |
| 2014/0064203 A1* | 3/2014 | Seo | ................... | H04W 28/06 370/329 |
| 2015/0043438 A1* | 2/2015 | Fwu | ................... | H04W 28/24 370/329 |
| 2015/0049732 A1* | 2/2015 | Xue | ................... | H04L 1/1854 370/330 |
| 2015/0078279 A1* | 3/2015 | Ko | ................... | H04L 1/1861 370/329 |
| 2015/0163689 A1* | 6/2015 | Lee | ................... | H04W 76/023 370/328 |
| 2015/0264677 A1* | 9/2015 | He | ................... | H04W 72/02 370/312 |
| 2015/0271840 A1* | 9/2015 | Tavildar | ................... | H04L 1/08 370/329 |
| 2015/0271846 A1* | 9/2015 | Kowalski | ................... | H04W 72/14 370/329 |
| 2015/0326998 A1* | 11/2015 | Wanstedt | ................... | H04W 4/008 370/329 |
| 2015/0327220 A1* | 11/2015 | Pan | ................... | H04W 72/042 370/329 |
| 2015/0327240 A1* | 11/2015 | Yamada | ................... | H04W 72/02 455/426.1 |
| 2015/0334698 A1* | 11/2015 | Park | ................... | H04W 4/005 455/426.1 |
| 2015/0365840 A1* | 12/2015 | Yang | ................... | H04L 5/0048 370/254 |
| 2016/0044652 A1* | 2/2016 | Xue | ................... | H04W 56/001 370/329 |
| 2016/0044653 A1* | 2/2016 | Bagheri | ................... | H04W 72/0413 370/329 |
| 2016/0095131 A1* | 3/2016 | Seo | ................... | H04W 72/085 370/329 |
| 2016/0183276 A1* | 6/2016 | Marinier | ................... | H04W 72/02 370/329 |
| 2016/0248550 A1* | 8/2016 | Sorrentino | ................... | H04L 1/08 |
| 2016/0286570 A1* | 9/2016 | Chae | ................... | H04W 72/1263 |
| 2016/0295595 A1* | 10/2016 | Chae | ................... | H04W 72/00 |
| 2017/0142741 A1* | 5/2017 | Kaur | ................... | H04W 72/121 |

OTHER PUBLICATIONS

Intel Corporation, "eNB Controlled Resource Allocation for D2D Communication", 3GPP TSG RAN WG1 Meeting #77, May 10, 2014, 7 pgs.

Samsung, "Mode 1 Resource Allocation for D2D Broadcast Communication", 3GPP TSG RAN WG1 Meeting #77, May 10, 2014, 8 pgs.

International Search Report and Written Opinion issued for PCT/KR2015/008262, dated Nov. 16, 2015, 9 pgs.

* cited by examiner

METHODS AND APPARATUS FOR RESOURCE ALLOCATION FOR D2D COMMUNICATIONS

CROSS-REFERENCE TO RELATED APPLICATION(S) AND CLAIM OF PRIORITY

The present application claims priority to U.S. Provisional Patent Application Ser. No. 62/035,302, filed Aug. 8, 2014, Ser. No. 62/039,876, filed Aug. 20, 2014, and Ser. No. 62/055,409, filed Sep. 24, 2014, each entitled "METHODS AND APPARATUS FOR RESOURCE ALLOCATION FOR D2D COMMUNICATIONS". The content of the above-identified patent documents are incorporated herein by reference.

TECHNICAL FIELD

The present application relates generally to wireless communication systems and, more specifically, to resource allocation for device-to-device (D2D) communications.

BACKGROUND

D2D or "ad-hoc" networks can be established by direct communication between mobile devices without an intermediary access point. Some devices can communicate both on traditional networks and using D2D techniques. Improved systems and methods are desirable.

SUMMARY

Methods and apparatus for resource allocation for D2D communications are provided.

A first embodiment includes a method for for wireless communication in a hybrid communication network. A method includes transmitting, by a first user equipment (UE), a scheduling request to a first eNodeB (eNB). The scheduling request indicates that the UE is capable of device-to-device (D2D) communications. The method includes receiving, by the first UE, a first scheduling assignment (SA) from the first eNB. The first SA indicates resources to be used by the first UE for device-to-device (D2D) communications with the first eNB. The method includes communicating, by the first UE, with the first eNB according to the first SA A second embodiment includes an user equipment (UE) in a hybrid communication network, having at least a controller, a memory, and a transceiver. The UE is configured to transmit a scheduling request to a first eNodeB (eNB). The scheduling request indicates that the UE is capable of device-to-device (D2D) communications The UE is configured to transmit a scheduling request to a first eNodeB (eNB) receive a first scheduling assignment (SA) from the first eNB. The first SA indicates resources to be used by the first UE for device-to-device (D2D) communications with the first eNB The UE is configured to transmit a scheduling request to a first eNodeB (eNB)communicate with the first eNB according to the first SA According to various embodiments, the SA indicates a first set of time domain resources for new D2D transport blocks or data, and also indicates a second set of time domain resources for retransmissions of D2D transport blocks or data. According to various embodiments, the SA includes a bit field that indicates a periodicity of new D2D transport block transmissions. According to various embodiments, the SA includes a retransmission time pattern index that is associated with a retransmission time pattern indicator. According to various embodiments, the SA includes a bit field that indicates a first set of time domain resources for new D2D transport blocks or data, a second set of time domain resources for retransmissions of D2D transport blocks or data, and a number of retransmissions of each D2D transport block. According to various embodiments, the SA indicates a periodicity of a D2D data transmission burst, including a period of transmission and retransmission of a D2D transport block, and a D2D transmission time domain pattern for the D2D transport block. According to various embodiments, the SA indicates a first set of frequency domain resources for control or SA transmissions, and also indicates a second set of frequency domain resources for transmissions of D2D transport blocks or data. According to various embodiments, the SA includes at least one bit field for allocating both time-domain resources and frequency-domain resources. According to various embodiments, the SA includes at least one table indicating possible time resource patterns for transmission. According to various embodiments, the SA implicitly indicates the resources to be used by the first UE for D2D based on a frequency location of the SA.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method.

Disclosed embodiments include relate generally to wireless communication systems and, more specifically, to device-to-device (D2D) communication resource allocation methods. A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

Figure 1:
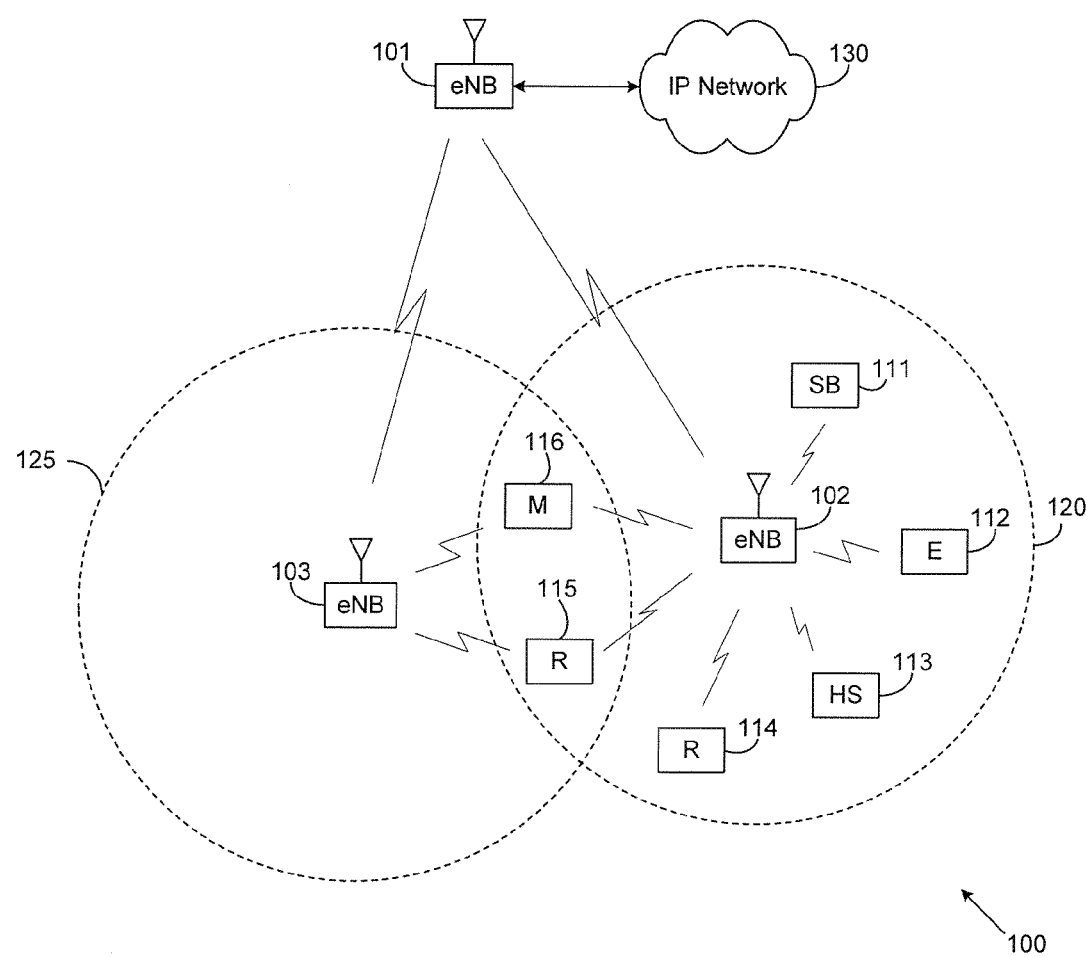
FIG. 1 illustrates an example wireless network according to this disclosure.

Various acronyms and abbreviations may be used in the discussion herein, as follows:

ACK Acknowledgement
ARQ Automatic Repeat Request
CA Carrier Aggregation
CQI Channel Quality Indicator
C-RNTI Cell RNTI
CRS Common Reference Signal
CSI Channel State Information
CSI-RS Channel State Information Reference Signal
D2D Device-to-Device
DCI Downlink Control Information
DL Downlink
DMRS Demodulation Reference Signal
DTX Discontinuous Transmission
DRX Discontinuous Reception
EPDCCH Enhanced PDCCH
FDD Frequency Division Duplexing
HARQ Hybrid ARQ
IE Information Element
MCS Modulation and Coding Scheme
MBSFN Multimedia Broadcast multicast service Single Frequency Network
MeNB Master eNodeB
O&M Operation and Maintenance
PCell Primary Cell
PCI Physical Cell Identity
PDCCH Physical Downlink Control Channel
PDSCH Physical Downlink Shared Channel
PMCH Physical Multicast Channel
PRB Physical Resource Block
PRS Positioning Reference Signal
PSS Primary Synchronization Signal
PUCCH Physical Uplink Control Channel
PUSCH Physical Uplink Shared Channel
QAM Quadrature Amplitude Modulation
QoS Quality of Service
QPSK Quadrature Phase Shift Keying
RACH Random Access Channel
RE Resource Elements
RNTI Radio Network Temporary Identifier
RRC Radio Resource Control
RS Reference Signals
RSRP Reference Signal Received Power
SCell Secondary Cell
SCH Synchronization Channel
SeNB Secondary eNodeB
SFN System Frame Number
SIB System Information Block
SINR Signal to Interference and Noise Ratio
SSS Secondary Synchronization Signal
SR Scheduling Request
SRS Sounding RS
TA Timing Advance
TAG Timing Advance Group
TB Transport Block
TBS TB Size
TDD Time Division Duplexing
TPC Transmit Power Control
TTI Transmission Time Interval
UCI Uplink Control Information
UE User Equipment
UL Uplink
UL-SCH UL Shared Channel FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
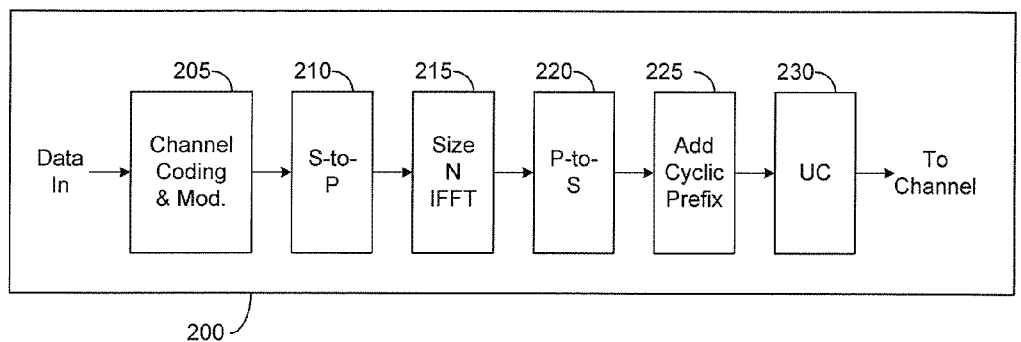
FIGS. 2A and 2B illustrate example wireless transmit and receive paths according to this disclosure.
Figure 2B:
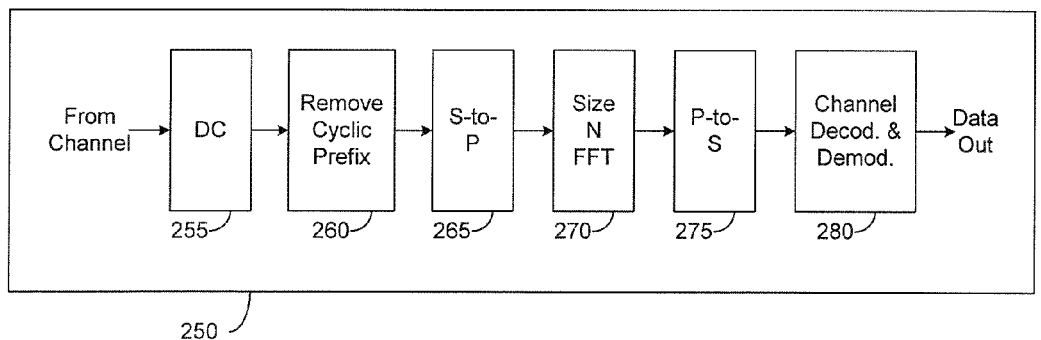

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to insert general description of at least one aspect of invention.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation. One or more hardware controllers can be used to implement each or multiple ones of the components illustrated in these figures.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
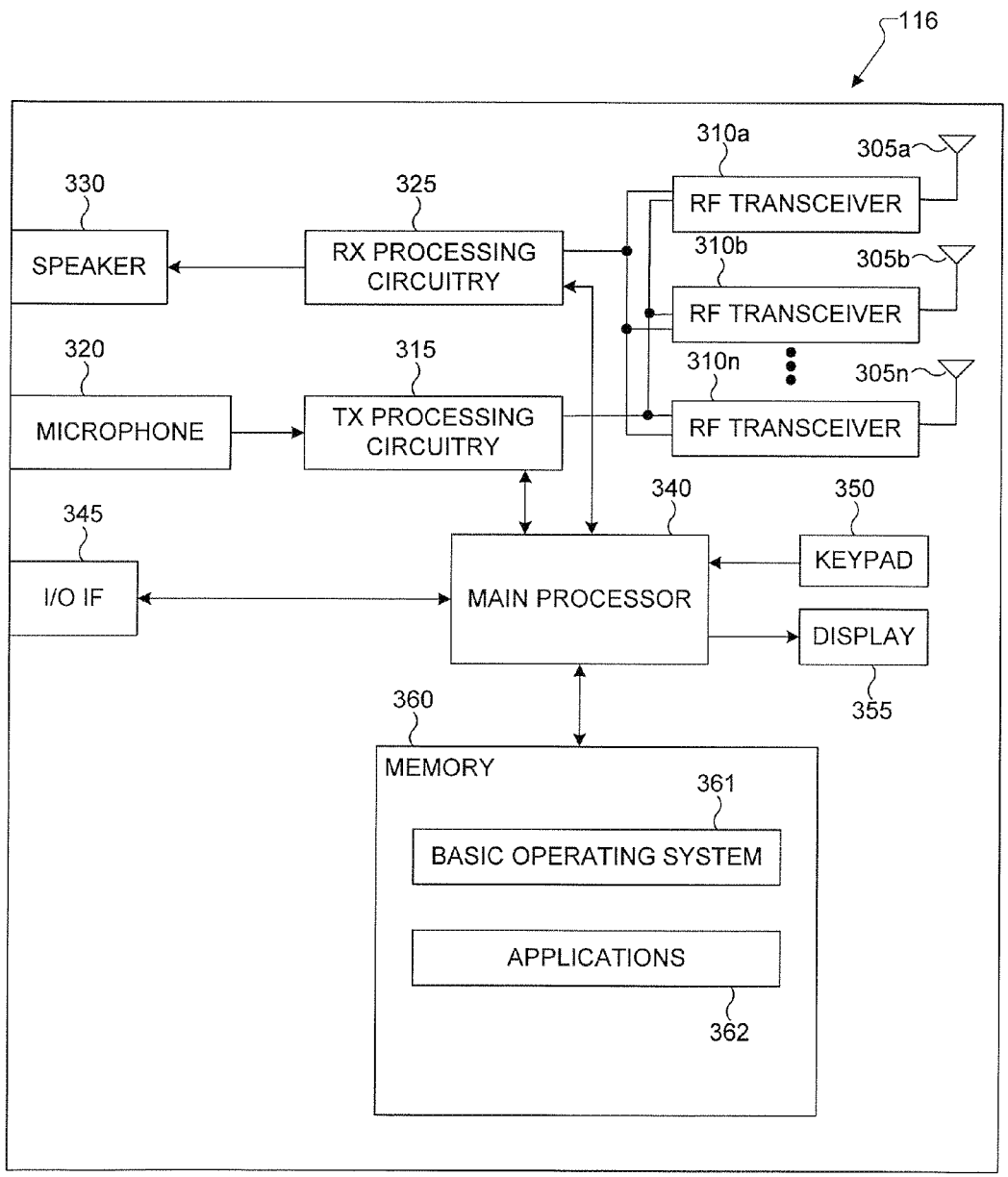
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1A could have the same or similar configuration. However, UEs come in a wide variety of configurations, and FIG. 3 does not limit the scope of this disclosure to any particular implementation of a UE.

The UE 116 includes multiple antennas 305a-305n, radio frequency (RF) transceivers 310a-310n, transmit (TX) processing circuitry 315, a microphone 320, and receive (RX) processing circuitry 325. The TX processing circuitry 315 and RX processing circuitry 325 are respectively coupled to each of the RF transceivers 310a-310n, for example, coupled to RF transceiver 310a, RF transceiver 210b through to a Nth RF transceiver 310n, which are coupled respectively to antenna 305a, antenna 305b and an Nth antenna 305n. In certain embodiments, the UE 116 includes a single antenna 305a and a single RF transceiver 310a. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceivers 310a-310n receive, from respective antennas 305a-305n, an incoming RF signal transmitted by an eNB or AP of the network 100. In certain embodiments, each of the RF transceivers 310a-310n and respective antennas 305a-305n is configured for a particular frequency band or technological type. For example, a first RF transceiver 310a and antenna 305a can be configured to communicate via a near-field communication, such as BLUETOOTH®, while a second RF transceiver 310b and antenna 305b can be configured to communicate via a IEEE 802.11 communication, such as Wi-Fi, and another RF transceiver 310n and antenna 305n can be configured to communicate via cellular communication, such as 3G, 4G, 5G, LTE, LTE-A, or WiMAX. In certain embodiments, one or more of the RF transceivers 310a-310n and respective antennas 305a-305n is configured for a particular frequency band or same technological type. The RF transceivers 310a-310n down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceivers 310a-310n receive the outgoing processed baseband or IF signal from the TX processing circuitry 315 and up-converts the baseband or IF signal to an RF signal that is transmitted via one or more of the antennas 305a-305n.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceivers 310a-310n, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for insert general description of at least one aspect of invention. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The user of the UE 116 can use the keypad 350 to enter data into the UE 116. The display 355 can be a liquid crystal display or other display capable of rendering text or at least limited graphics, such as from web sites, or a combination thereof.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
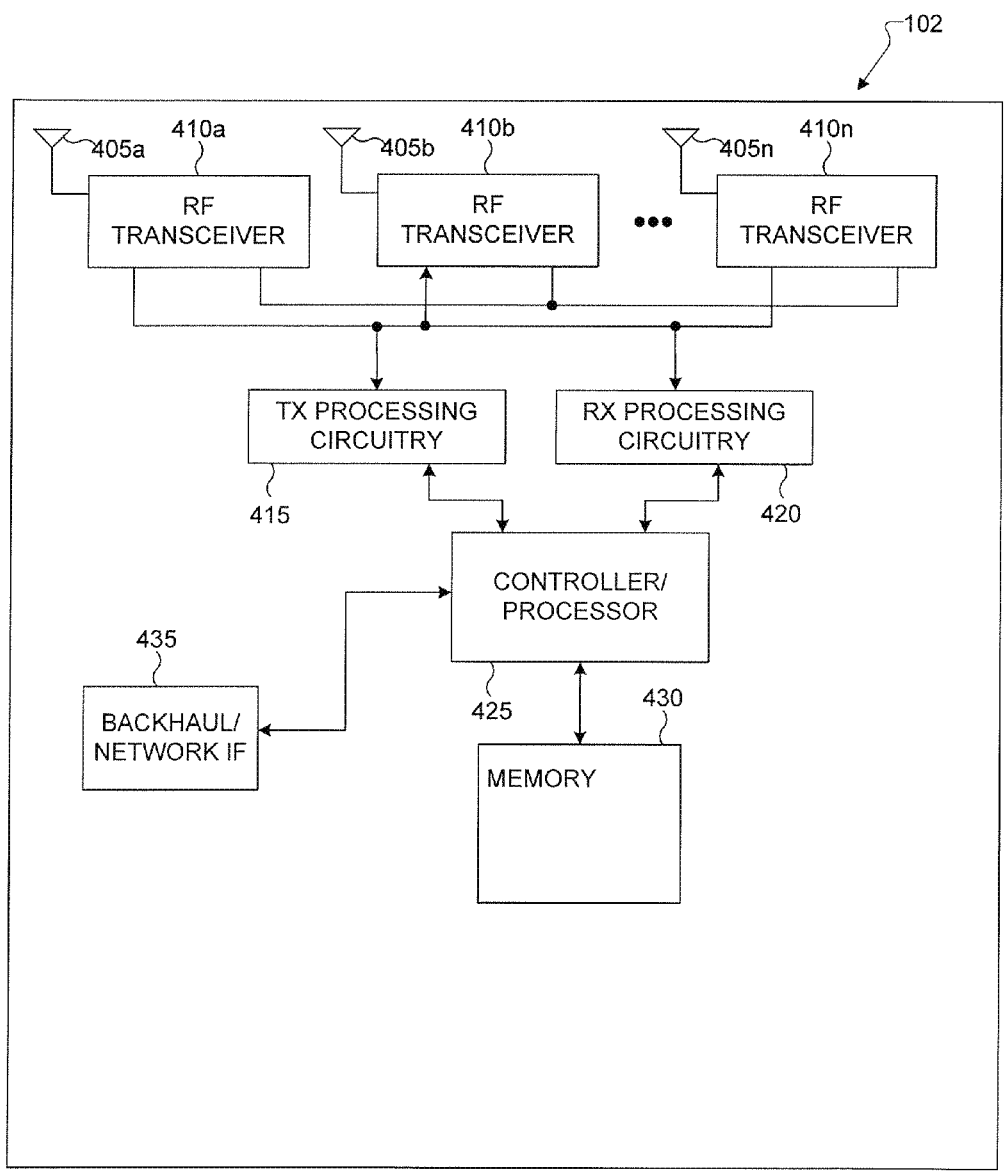
FIG. 4 illustrates an example eNB according to this disclosure.

FIG. 4 illustrates an example eNB 102 according to this disclosure. The embodiment of the eNB 102 shown in FIG. 4 is for illustration only, and other eNBs of FIG. 1 could have the same or similar configuration. However, eNBs come in a wide variety of configurations, and FIG. 4 does not limit the scope of this disclosure to any particular implementation of an eNB.

As shown in FIG. 4, the eNB 102 includes multiple antennas 405a-405n, multiple RF transceivers 410a-410n, transmit (TX) processing circuitry 415, and receive (RX) processing circuitry 420. The eNB 102 also includes a controller/processor 425, a memory 430, and a backhaul or network interface 435.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the eNB 102. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the eNB 102 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the eNB 102 to communicate with other devices or systems over a backhaul connection or over a network. The interface 435 could support communications over any suitable wired or wireless connection(s). For example, when the eNB 102 is implemented as part of a cellular communication system (such as one supporting 5G, LTE, or LTE-A), the interface 435 could allow the eNB 102 to communicate with other eNBs over a wired or wireless backhaul connection. When the eNB 102 is implemented as an access point, the interface 435 could allow the eNB 102 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the eNB 102 (implemented using the RF transceivers 410a-410n, TX processing circuitry 415, and/or RX processing circuitry 420) support communication with aggregation of FDD cells and TDD cells.

Although FIG. 4 illustrates one example of an eNB 102, various changes may be made to FIG. 4. For example, the eNB 102 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the eNB 102 could include multiple instances of each (such as one per RF transceiver).

DL signals include data signals conveying information content, control signals conveying DL Control Information (DCI), and Reference Signals (RS), which are also known as pilot signals. An eNodeB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNodeB transmits one or more of multiple types of RS including a UE-Common RS (CRS), a Channel State Information RS (CSI-RS), and a DeModulation RS (DMRS). A CRS is transmitted over a DL system BandWidth (BW) and can be used by UEs to demodulate data or control signals or to perform measurements. To reduce CRS overhead, an eNodeB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used [3]. A UE can determine the CSI-RS transmission parameters through higher layer signaling from an eNodeB. DMRS is transmitted only in the BW of a respective PDSCH and a UE can use the DMRS to demodulate information in a PDSCH.

Figure 5:
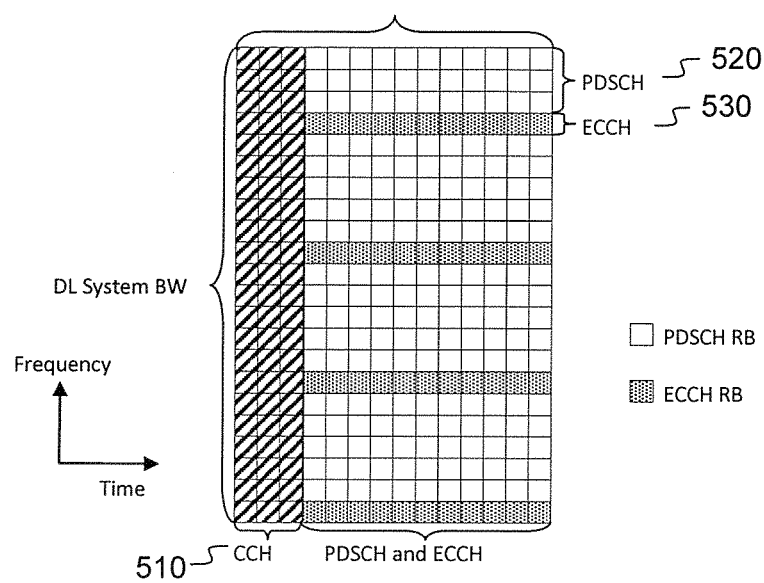
FIG. 5 illustrates a structure of a DL Transmission Time Interval in accordance with an embodiment of this disclosure.

FIG. 5 illustrates a structure of a DL Transmission Time Interval (TTI). As illustrated in FIG. 5 DL signaling uses Orthogonal Frequency Division Multiplexing (OFDM) and a DL TTI includes N=14 OFDM symbols in the time domain and K Resource Blocks (RBs) in the frequency domain. A first type of Control CHannels (CCHs) is transmitted in a first N1 OFDM symbols 510 (including no transmission, N1=0). A remaining N-N1 OFDM symbols are used primarily for transmitting PDSCHs 520 and, in some RBs of a TTI, for transmitting a second type of CCHs (ECCHs) 530.

Some cellular communication networks are designed to establish wireless communication links between mobile devices and fixed communication infrastructure components (such as base stations or access points) that serve users in a wide or local geographic range. However, a wireless network can also be implemented utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices.

Figure 6:
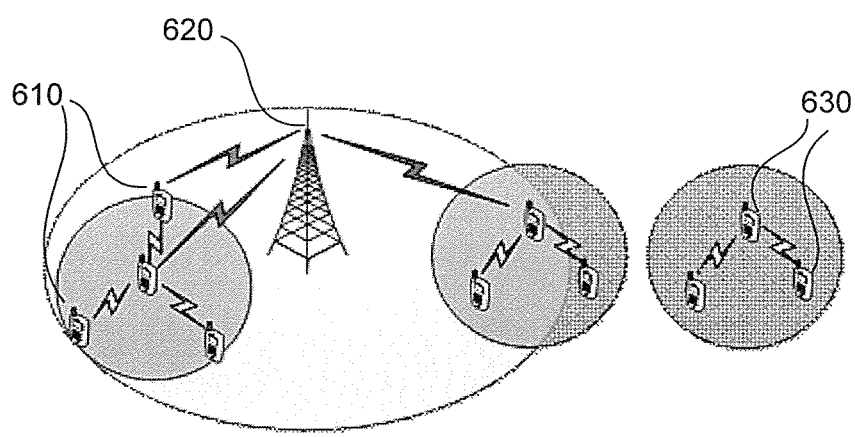
FIG. 6 shows illustrates LTE D2D communication in accordance with an embodiment of this disclosure.

FIG. 6 shows examples of topologies of such networks and illustrates LTE D2D communication. As illustrated in this figure, UEs 610 can communicate among each other using D2D communication links, and can also communicate with eNB 620. Similarly, UEs 630 can communicate among each other using D2D communication links, even though they are out of the range of and cannot communicate with eNB 620.

D2D communication may be used to implement many kinds of services that are complementary to the primary communication network or provide new services based on the flexibility of the network topology. D2D multicast communication such as broadcasting or groupcasting is a potential means for D2D communication where mobile devices are able to transmit messages to all in-range D2D-enabled mobile devices or a subset of mobile devices which are members of particular group. Additionally networks may require devices to operate in near simultaneous fashion when switching between cellular and D2D communication modes.

In the case of cellular unicast operation, resources for UE transmission are allocated per TTI. This level of granularity is beneficial to support very dynamic allocation and provides flexibility to accommodate different numbers of simultaneously transmitting users and different data rates.

Figure 7:
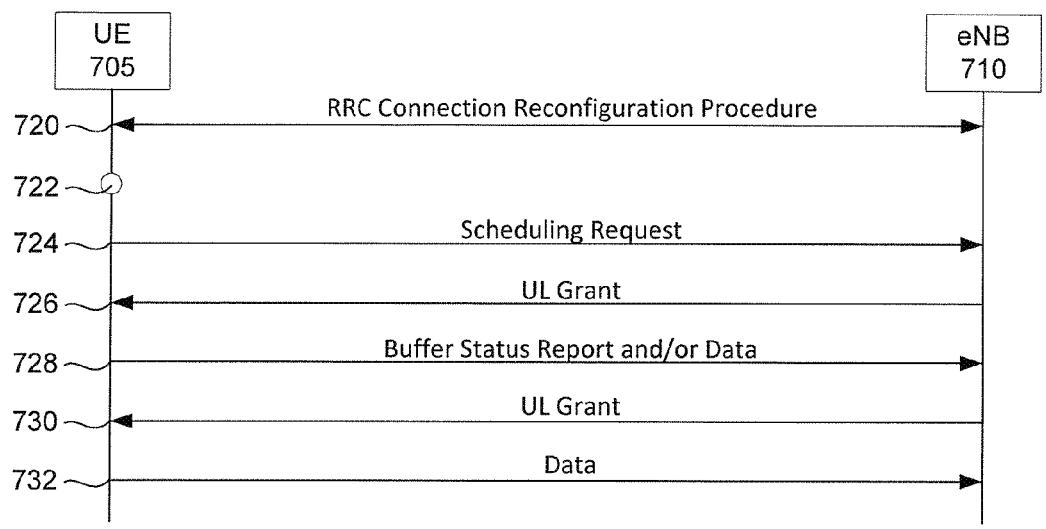
FIG. 7 illustrates a cellular resource allocation procedure between a UE and an eNB in accordance with an embodiment of this disclosure.

FIG. 7 illustrates one cellular resource allocation procedure between UE 705 and eNB 710. At 720, UE 705 transmits to eNB 710 an RRC connection reconfiguration procedure. At 722, UE 705 has data ready to send. At 724, eNB 710 transmits to UE 705 a scheduling request. At 726, UE 705 transmits to eNB 710 a UL grant. At 728, eNB 710 transmits to UE 705 a buffer status report, data, or both a buffer status report and data. At 730, UE 705 transmits to eNB 710 a UL grant. At 732, eNB 710 transmits its data to UE 705.

D2D also requires resource allocation mechanisms since multiple UEs may have a need to utilize the same time/frequency resources as other D2D or cellular UEs. In addition to resource allocation signaling for the transmitting UEs, in the case of D2D, receiving UEs may also require resource allocation signaling in order to determine which time/frequency resources to monitor to receive the transmissions of one of more D2D UEs. Different resource allocation granularity may be used depending on multiple factors including deployment scenario (in/outside network coverage) and traffic types (e.g. unicast, groupcast, video, etc.).

For centralized resource management, a central controller like the eNB collects all the channel state information of every UE in the cell and allocates the available resources to maximize the throughput according to fairness and power constraints. For UEs within network coverage, the eNB may be responsible for allocating resources for a group of UEs. Based on the eNB (or possibly group leader UE) resource allocation the transmitting UEs may provide a scheduling assignment signaling indicating the resources the Rx UEs should monitor for reception of the D2D data.

On the other hand, especially considering the out-of-network coverage scenario, UEs can determine their resource allocation in a distributed fashion. Simple random resource selection may be considered as a baseline distributed approach with low overhead and scalability. One drawback of such an approach is that collisions are possible among broadcasting UEs. Thus an implicit coordination (e.g., carrier sensing) and/or explicit coordination (e.g., scheduling assignment transmission) would be required to prevent collisions and mitigate interference.

Figure 8:
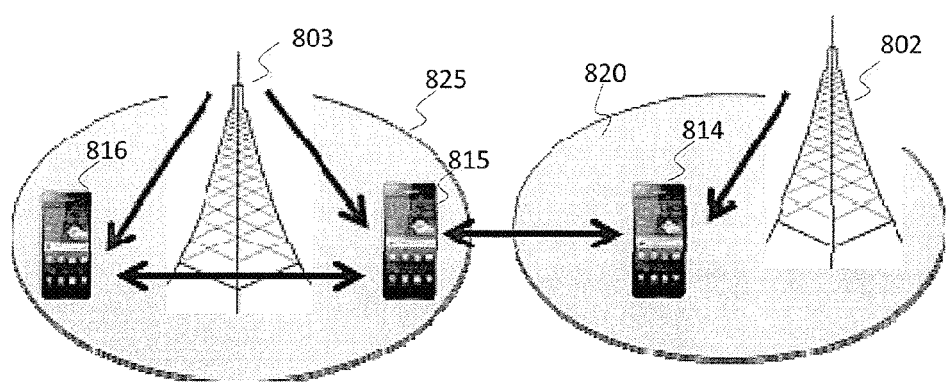
FIG. 8 illustrates a resource allocation for D2D communication in accordance with an embodiment of this disclosure.

FIG. 8 illustrates a resource allocation for D2D communication, including both centralized and distributed resource allocation. In this example, eNB 803 allocates resources to communicate with UE 815 and UE 816 in its wireless coverage area 825, for example in response to one or more scheduling requests. Similarly, eNB 802 allocates resources to communicate with UE 814 in its wireless coverage area 820. At the same time, UE 814, UE 815, and UE 816 can allocate resources to communicate between each other using D2D communications.

Furthermore, resource pools can be defined as periodic sets of time/frequency resources which UEs utilize for a given D2D transmission and receiving UEs can search for potential transmissions, including scheduling assignments and data transmissions.

Figure 9:
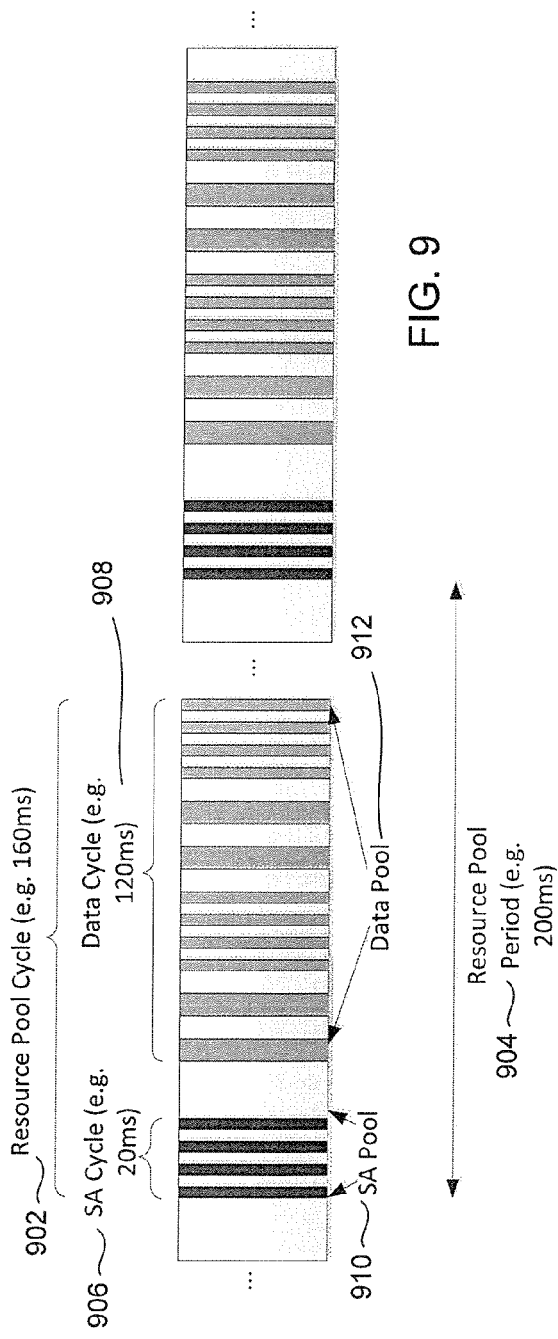
FIG. 9 illustrates a resource pool with scheduling assignment (SA) and data resources in accordance with disclosed embodiments.

FIG. 9 illustrates a resource pool with scheduling assignment (SA) and data resources in accordance with disclosed embodiments. Shown here is a single resource pool cycle 902 with a resource pool period 904. The resource pool cycle includes an SA cycle 906 and a data cycle 908. An SA pool 910 is present during SA cycle 906, and a data pool 912 is present during data cycle 908.

In a "hybrid" deployment where the UEs both communicate with eNBs and with each other, disclosed embodiments provide resources allocation signaling for the D2D communication. In particular embodiments, the eNB can indicate what resources should be used by the UEs for D2D communications.

Various embodiments manage D2D communications by specifying D2D data time locations. According to a first disclosed embodiment, the eNB can indicate to a D2D UE transmitter two separate time domain resources, including a first set of time domain resources for new D2D transport blocks or data, and a second set of time domain resources for retransmissions of D2D transport blocks or data.

The control information on the time domain resources can be included in an SA grant. After the D2D transmitter UE has received the SA grant, the D2D transmitter UE can indicate the same information in its SA transmission. The D2D transmitter UE then transmits new D2D transport blocks in the first set of time domain resources and transmits retransmissions of D2D transport blocks in the second set of time domain resources. After a D2D receiver UE has received the SA, the D2D receiver UE can receive new D2D transport blocks from the first set of time domain resources and the D2D receiver UE can receive retransmission of D2D transport blocks from the second set of time domain resources.

For the first set of time domain resources, an SA grant and the corresponding SA can include a bit field (called time resource periodicity indicator) that indicates the periodicity of new D2D transport block transmission (d2dDataPeriodicity). In a first example, for a FDD system, the SA grant and the corresponding SA can include a 4-bit field to indicate one of the following 10 (or a subset thereof) periodicities for new D2D data or transport block transmissions: 10 subframes, 20 subframes, 32 subframes, 40 subframes, 64 subframes, 80 subframes, 128 subframes, 160 subframes, 320 subframes, 640 subframes. For a TDD system, the SA grant and the corresponding SA can also use 4 bits to indicate one of the following 10 (or a subset thereof) periodicities for new D2D transport blocks transmissions: 10 subframes, 20 subframes, 30 subframes, 40 subframes, 60 subframes, 80 subframes, 120 subframes, 160 subframes, 320 subframes, 640 subframes.

Table 1 below illustrates such an example of time resource periodicity indicator in SA grant and SA. The set of periodicities are chosen to match with the existing periodicities supported by semi-persistent scheduling of PDSCH for carrying VoIP traffic.

TABLE 1

| Time resource periodicity indicator | FDD D2D data periodicity (subframes or miliseconds) | TDD D2D data periodicity (subframes or miliseconds) |
|---|---|---|
| 0000 | 10 | 10 |
| 0001 | 20 | 20 |
| 0010 | 32 | 30 |
| 0011 | 40 | 40 |
| 0100 | 64 | 60 |
| 0101 | 80 | 80 |
| 0110 | 128 | 120 |
| 0111 | 160 | 160 |
| 1000 | 320 | 320 |
| 1001 | 640 | 640 |
| 1010-1111 | reserved | reserved |

Table 2 illustrates a second example of time resource periodicity indicator in SA grant and SA, for both FDD and TDD systems, where the same set of periodicities are applied. The advantages of the second example are common design for both FDD and TDD, and that a larger periodicity is always an integer multiple of a smaller periodicity which helps reduce fragmentation of UL resources to D2D communications.

TABLE 2

| Time resource periodicity indicator | D2D data periodicity (subframes or miliseconds) |
|---|---|
| 0000 | 10 |
| 0001 | 20 |
| 0010 | 30 |
| 0011 | 40 |
| 0100 | 60 |
| 0101 | 80 |
| 0110 | 120 |
| 0111 | 160 |
| 1000 | 320 |
| 1001 | 640 |
| 1010-1111 | Reserved |

The time location of an SA, determined by its subframe number (SFN) (SFNstart time, 0 . . . 10240) and its subframe index (subframestart time, 0 . . . 9), can indicate the start time of the corresponding new D2D data or transport blocks scheduled by the SA. In other words, the time location of the SA as well as the time resource periodicity indicator indicate the absolute time locations of new D2D transport blocks.

Given the same periodicity, if the SAs of two D2D UEs are transmitted in different subframes, the first D2D data subframes of the two D2D UEs are also different; this ensures the two D2D UEs can hear each other's SA and the other D2D receiver UEs can also receive the D2D SA and data from both D2D transmitter UEs. If an SA can be retransmitted one or more times to enable its reliable receptions by the other D2D capable UEs, the time location of the first transmitted SA can indicate the start time of the corresponding new D2D transport blocks.

Another disclosed technique is to use the time location of the last transmitted SA to indicate the start time of the corresponding new D2D transport blocks. In another disclosed technique, the time location of the first SA subframe within a configured SA cycle is used as the reference to indicate the start time. If the configured SA cycle is common for multiple D2D UEs, the reference SA for multiple D2D UEs can be aligned regardless of the actual transmission times of the SAs of the UEs. In another disclosed technique, the SA transmission pattern, consists of an SA and its retransmission instances, can implicitly determine the start time of the new D2D data, e.g. each SA transmission pattern is mapped to a pair of SFNstart time and subframestart time. The SA subframe used for determining SFNstart time and subframestart time shall be referred to as the reference SA subframe.

In one example, the Nth new D2D data or transport block is transmitted in the subframe for which $$(10*SFN+subframe)=[(10*SFN_{start\ time}+subframe_{start\ time})N*d2dDataPeriodicity]\ modulo\ 10240, \quad (Eq\ 1)$$

where $SFN_{start\ time}$ and $subframe_{start\ time}$ are the SFN and subframe, respectively, for the reference SA.

Figure 10:
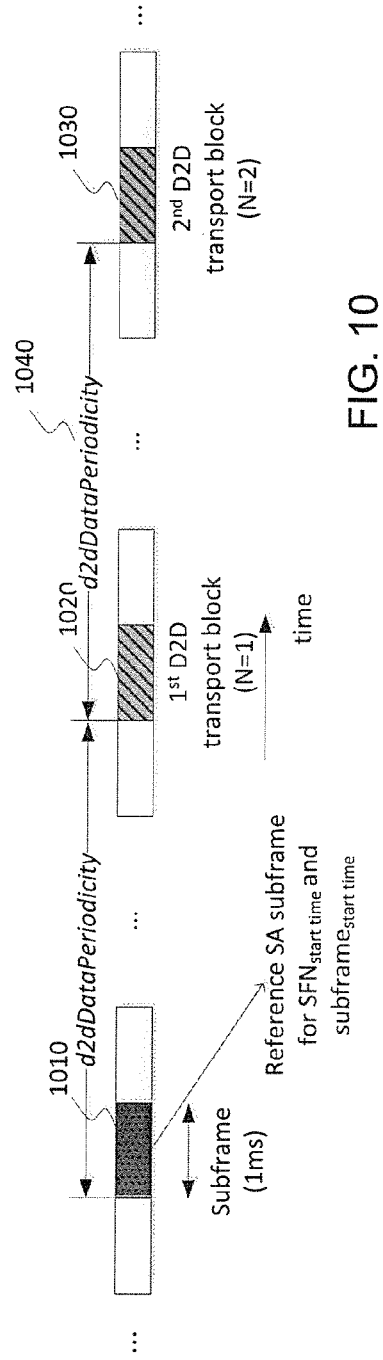
FIG. 10 illustrates a time location of a D2D transport block in accordance with disclosed embodiments.

FIG. 10 illustrates a time location of an $N^{th}$ new D2D transport block, in accordance with disclosed embodiments. This figure illustrates that each reference subframe or D2D transport block is located at a predetermined time location in the frame during the D2D data period, denoted d2dDataPeriodicity 1040. In this example, in a first D2D data period, a reference SA subframe 1010 is transmitted for the $SFN_{start\ time}$ and $subframe_{start\ time}$. In subsequent frames, a first D2D transport block 1020 (N=1) is transmitted, then a second D2D transport block 1030 (N=2) is transmitted.

For the second set of time domain resources, an SA grant and the corresponding SA can include a bit field that indicates the location of the second set of time domain resources for D2D transport block retransmission purpose. In one example, assuming D2D UEs are configured by the higher layer the subframes reserved for D2D communications, the signaling in the SA grant and the corresponding SA can indicate the number of retransmissions for each D2D transport block (denoted as M) and the subframes assumed by the D2D UE for retransmissions can be the first M subframes of the reserved D2D subframes after the subframe carrying the new D2D transport block. The number of bits to indicate the number of retransmissions can be $\lceil \log_2 (M_{max}+1) \rceil$, where $M_{max}$ is the maximum M value. Table 3 shows an example for a 2-bit M indicator where up to 3 retransmissions can be indicated.

TABLE 3

| M indicator | M |
|---|---|
| 00 | 0 |
| 01 | 1 |
| 10 | 2 |
| 11 | 3 |

Figure 11:
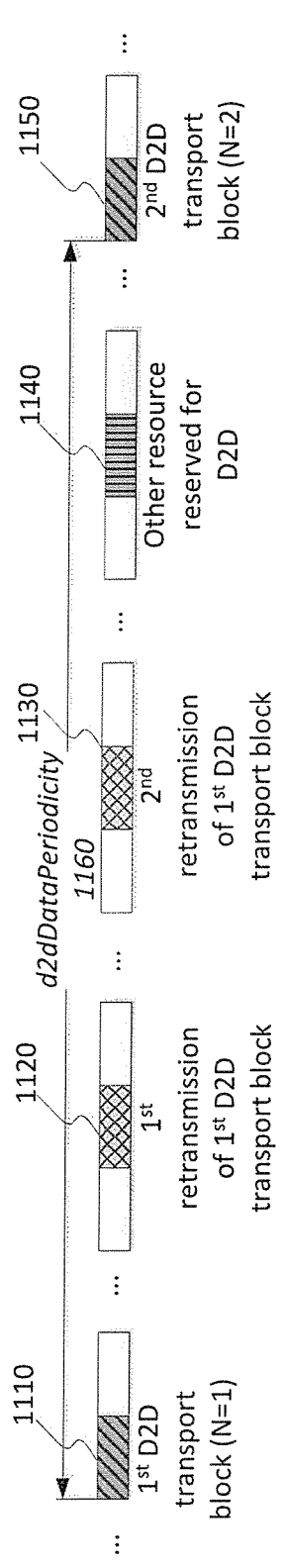
FIG. 11 illustrates assignment of retransmission locations and numbers in accordance with disclosed embodiments.

FIG. 11 illustrates assignment of retransmission locations and numbers where M=2, indicating that there will be two retransmissions. A first D2D data period 1160 (d2dDataPeriodicity) includes a first D2D transport block 1110 (N=1). It is followed by a first retransmission of the first D2D transport block 1120 and a second retransmission of the first D2D transport block 1130. The first D2D data period 1160 can also include other resources 1140 reserved for D2D communications. After the first D2D data period 1160 ends, another D2D data period can follow with a second D2D transport block 1150 (N=2).

In another example, assuming D2D UEs are configured by the higher layer (e.g. RRC), a set of retransmission time patterns where each pattern is labeled with an index, the signaling in the SA grant and the corresponding SA can indicate the retransmission time pattern index. The set of retransmission time patterns can have default values in the absence of higher layer signaling. The set of retransmission time patterns can also be predefined.

Table 4 shows an example of a retransmission time indicator for a 2-bit field indicating up to 4 retransmission time patterns.

TABLE 4

| Retransmission time pattern indicator | Retransmission time pattern index |
|---|---|
| 00 | 0 |
| 01 | 1 |
| 10 | 2 |
| 11 | 3 |

Each higher layer configured retransmission pattern can be a bitmap marking the subframes within the set of subframes reserved for D2D communications for D2D retransmissions. Table 5 illustrates a retransmission time pattern indicated by bitmap.

TABLE 5

| Retransmission time pattern index | Retransmission pattern Bitmap |
|---|---|
| 0 | Bitmap 1 |
| 1 | Bitmap 2 |
| 2 | Bitmap 3 |
| 3 | Bitmap 4 |

The size of the bitmap can be the number of D2D subframes in between two adjacent D2D subframes used for transmissions of new transport blocks or a smaller number. Bit value of one can be used to indicate that the subframe is used for D2D retransmission, e.g. a bitmap of 010 indicates that the second D2D subframe is used for retransmission.

Figure 12:
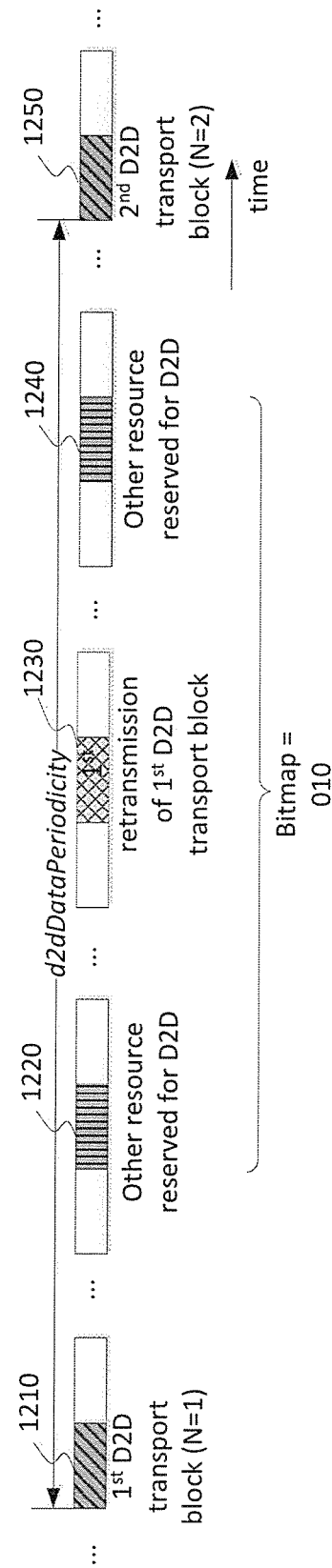
FIG. 12 illustrates an example of bitmap scheduling of retransmissions in accordance with an embodiment of this disclosure.

FIG. 12 illustrates an example of bitmap scheduling of retransmissions, where the bitmap indicates the retransmission time periods, using a bitmap of 010. In this example, the original first D2D transport block 1210 (N=1) is transmitted in a first subframe of the D2D data period. Retransmission is defined by the bitmap 010, so the next subframe 1220 (0 bit) is not used for retransmission but is used for other D2D resources. Then the following subframe 1230 (1 bit) is used for retransmission of the first D2D transport block. Finally, the following subframe 1240 (0 bit) is also not used for retransmission but is used for other D2D resources. In the next D2D data period, the second D2D transport block 1250 (N=2) is transmitted.

As an example of the retransmission time pattern construction, the patterns can be defined according to rows or columns of a Walsh matrice of order K, e.g. K=4, 8, etc, and its function. A Walsh matrix of order 4 is shown below.

$$W(4) = \begin{bmatrix} +1 & +1 & +1 & +1 \\ +1 & -1 & +1 & -1 \\ +1 & +1 & -1 & -1 \\ +1 & -1 & -1 & +1 \end{bmatrix},$$

With K=4, a set of retransmission time patterns can be constructed by taking the rows of the W(4) matrix, except the first row, and also their bit-wise inversion. 6 retransmission time patterns can be constructed this way, where 0 indicates no transmission and 1 indicates transmission. In this example, there are two retransmission opportunities for each pattern. Retransmission time patterns can also be constructed using higher order Walsh matrix (e.g. 8). Three bits can be used to signal the D2D data retransmission time pattern in SA grant and SA. The D2D data retransmission time pattern can also be implicitly indicated by the SA location, e.g. frequency location (PRB index) of the first SA transmission. The advantage is that explicit signaling in SA grant and SA is not needed. In this example, the frequency location of the first SA location can also indicate the SA transmission time pattern.

Table 6 illustrates a retransmission time pattern constructed using a Walsh matrix of order 4, where 0 indicates no transmission and 1 indicates transmission:

TABLE 6

| Retransmission time pattern index | Retransmission time pattern |
|---|---|
| 0 | 10 10 |
| 1 | 11 00 |
| 2 | 10 01 |
| 3 | 01 01 |
| 4 | 00 11 |
| 5 | 01 10 |

For simplicity and ease of implementation, it can be beneficial to impose the restriction that the number of retransmissions may not exceed the number of available D2D subframes in between two adjacent D2D subframes used for transmissions of new transport blocks.

The first and second time resource indicators can also be jointly indicated using one bit field. Table 7 shows an example of joint indication of time resource periodicity and M, where time resource periodicity and M indicator are jointly indicated with a 6-bit field. There is advantage of lower signaling overhead in certain cases e.g. if the maximum number of retransmission is 4 instead of 3, there is a saving of one bit.

TABLE 7

| Joint Time resource periodicity and M indicator | FDD D2D data periodicity (subframes or miliseconds) | TDD D2D data periodicity (subframes or miliseconds) | M |
|---|---|---|---|
| 000000 | 10 | 10 | 0 |
| 000001 | 10 | 10 | 1 |
| 000010 | 10 | 10 | 2 |
| 000011 | 10 | 10 | 3 |
| 000100 | 20 | 20 | 0 |
| 000101 | 20 | 20 | 1 |
| 000110 | 20 | 20 | 2 |
| 000111 | 20 | 20 | 3 |
| 001000 | 32 | 30 | 0 |
| 001001 | 32 | 30 | 1 |
| 001010 | 32 | 30 | 2 |
| 001011 | 32 | 30 | 3 |
| 001100 | 40 | 40 | 0 |
| 001101 | 40 | 40 | 1 |
| 001110 | 40 | 40 | 2 |
| 001111 | 40 | 40 | 3 |
| 010000 | 64 | 60 | 0 |
| 010001 | 64 | 60 | 1 |
| 010010 | 64 | 60 | 2 |
| 010011 | 64 | 60 | 3 |
| 010100 | 80 | 80 | 0 |
| 010101 | 80 | 80 | 1 |
| 010110 | 80 | 80 | 2 |

TABLE 7-continued

| Joint Time resource periodicity and M indicator | FDD D2D data periodicity (subframes or miliseconds) | TDD D2D data periodicity (subframes or miliseconds) | M |
|---|---|---|---|
| 010111 | 80 | 80 | 3 |
| 011000 | 128 | 120 | 0 |
| 011001 | 128 | 120 | 1 |
| 011010 | 128 | 120 | 2 |
| 011011 | 128 | 120 | 3 |
| 011100 | 160 | 160 | 0 |
| 011101 | 160 | 160 | 1 |
| 011110 | 160 | 160 | 2 |
| 011111 | 160 | 160 | 3 |
| 100000 | 320 | 320 | 0 |
| 100001 | 320 | 320 | 1 |
| 100010 | 320 | 320 | 2 |
| 100011 | 320 | 320 | 3 |
| 100100 | 640 | 640 | 0 |
| 100101 | 640 | 640 | 1 |
| 100110 | 640 | 640 | 2 |
| 100111 | 640 | 640 | 3 |
| 101000-101111 | reserved | reserved | reserved |

Instead of indicating both the first set of time domain resources and the second time domain resources in the SA grant and the SA. It is also possible to indicate only the the first set of time domain resources in the SA grant and the SA, whereas the second set of time domain resources can be configured by the higher layer.

According to a second disclosed embodiment, the eNodeB can indicate to a D2D UE transmitter time domain resources for D2D transmission, and can include a periodicity of D2D data transmission burst, comprising of a period of transmission and retransmission of a D2D transport block, and a D2D transmission time domain pattern for the D2D transport block.

The control information on the time domain resources can be included in an SA grant. After the D2D transmitter UE has received the SA grant, the D2D transmitter UE can indicate the same information in its SA transmission. The D2D transmitter UE then transmits new D2D transport blocks in the first set of time domain resources and transmits retransmissions of D2D transport blocks in the second set of time domain resources. After a D2D receiver UE has received the SA, the D2D receiver UE can receive new D2D transport blocks from the first set of time domain resources and the D2D receiver UE can receive retransmission of D2D transport blocks from the second set of time domain resources.

An SA grant and the corresponding SA can include a bit field (called time resource periodicity indicator) that indicates the periodicity of D2D data transmission burst (d2dDataBurstPeriodicity). In a first example, for a FDD system, the SA grant and the corresponding SA can include a 4-bit field to indicate one of the following 10 (or a subset thereof) periodicities for D2D data transmission burst: 10 subframes, 20 subframes, 32 subframes, 40 subframes, 64 subframes, 80 subframes, 128 subframes, 160 subframes, 320 subframes, 640 subframes. For a TDD system, the SA grant and the corresponding SA can also use 4 bits to indicate one of the following 10 (or a subset thereof) periodicities for D2D data burst transmissions: 10 subframes, 20 subframes, 30 subframes, 40 subframes, 60 subframes, 80 subframes, 120 subframes, 160 subframes, 320 subframes, 640 subframes. The example is illustrated in Error! Reference source not found. The set of periodicities are chosen to match with the existing periodicities supported by semi-persistent scheduling of PDSCH for carrying VoIP traffic. In a second example, for both FDD and TDD system, the same set of periodicities are applied as shown in Error! Reference source not found. The advantages of the second example are common design for both FDD and TDD, and that a larger periodicity is always an integer multiple of a smaller periodicity which helps reduce fragmentation of UL resources to D2D communications.

SA indicates the start of a D2D data transmission burst. In one example, the starting subframe of the Nth D2D data transmission burst is defined by $$(10*SFN+subframe)=[(10*SFN_{start\ time}+subframe_{start\ time})+N*d2dDataBurstPeriodicity]\ modulo\ 10240, \quad (Eq\ 2)$$

where $SFN_{start\ time}$ and $subframe_{start\ time}$ are the SFN and subframe, respectively, for a reference SA. Possible definitions of the reference SA can be the same as those described in the first method.

Figure 13:
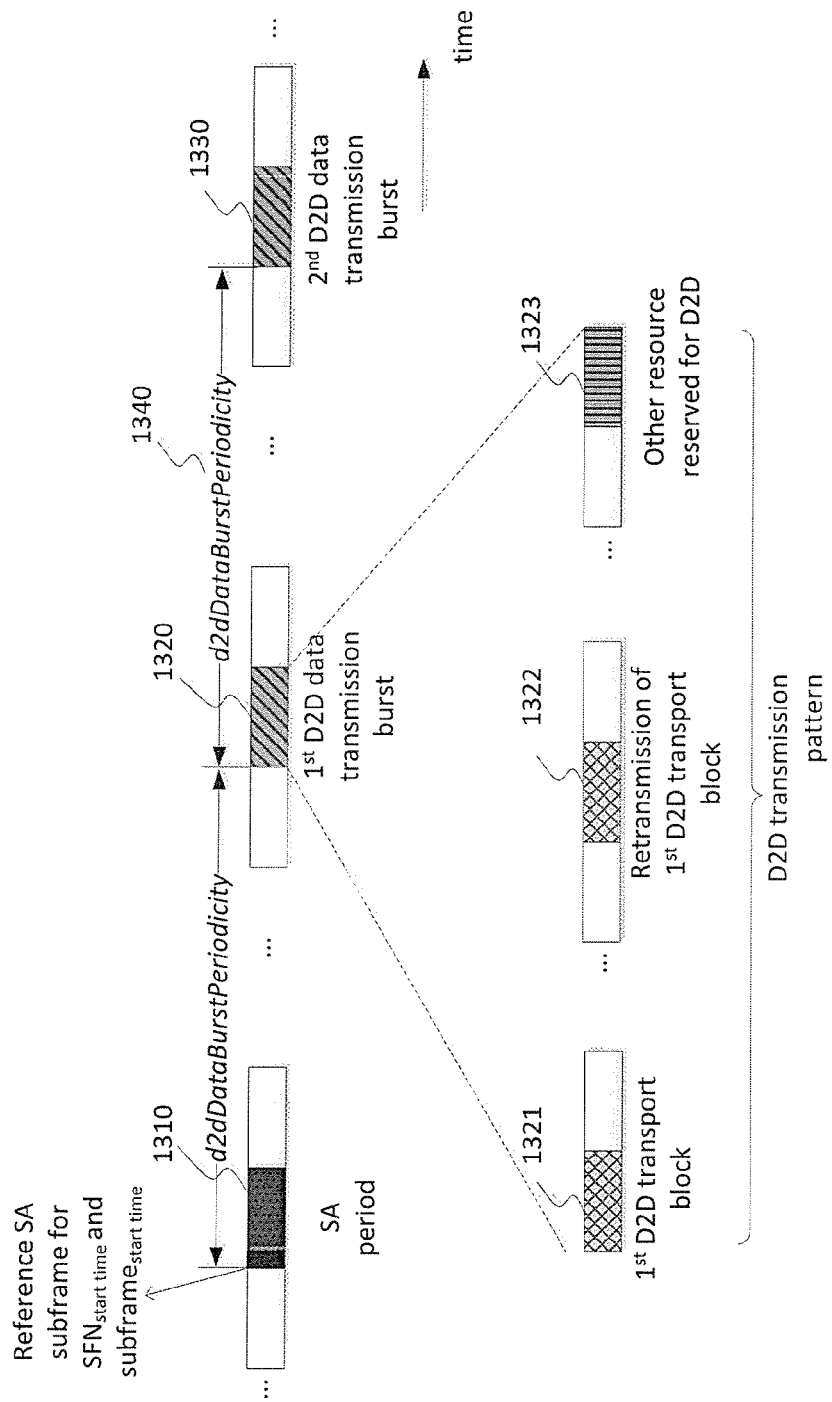
FIG. 13 illustrates an example of a reference SA and retransmission subframes in accordance with an embodiment of this disclosure.

FIG. 13 illustrates an example where the reference SA is the first subframe of an SA period where the SA can be transmitted multiple times in a subset of subframes within the SA period. This figure illustrates that each reference subframe or D2D transmission burst is located at a predetermined time location in the frame during the D2D data period, denoted d2dDataPeriodicity 1340. In this example, in a first D2D data period, a reference SA subframe 1310 is transmitted for the $SFN_{start\ time}$ and $subframe_{start\ time}$. In subsequent frames, a first transmission burst 1320 (N=1) is transmitted, then a second D2D transmission burst 1330 (N=2) is transmitted.

As illustrated, the first D2D transport burst 1320 can include multiple blocks in a D2D transmission pattern. In this example, first D2D transmission burst 1320 includes a first D2D transport block 1321, a retransmission of the first D2D transport block 1322, and other resources reserved for D2D 1323. In some cases, the system can use a bitmap as described herein to define the transmission time pattern of the transport blocks within the transmission burst.

Figure 14:
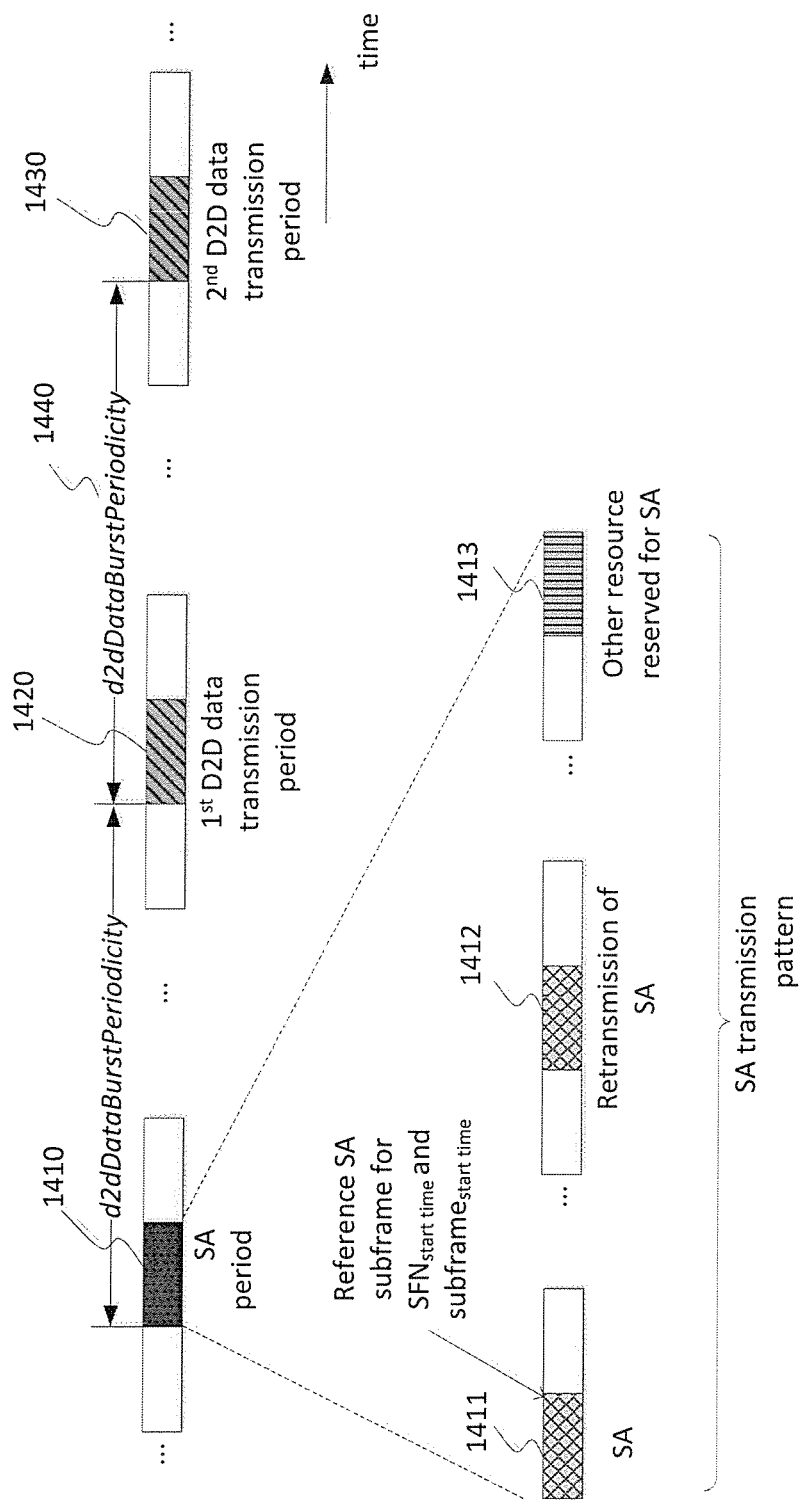
FIG. 14 illustrates an example of SA transmission pattern within the SA period in accordance with an embodiment of this disclosure.

FIG. 14 illustrates an example of SA transmission pattern within the SA period. This figure illustrates that each reference subframe or D2D transmission period is located at a predetermined time location in the frame during the D2D data period, denoted d2dDataBurstPeriodicity 1440. In this example, in a first D2D data period, a reference SA period 1410 is transmitted. As illustrated, the SA period 1410 can include multiple blocks in a D2D transmission pattern. In this example, SA period 1410 includes a SA 1411, a retransmission of the first SA 1412, and other resources reserved for SA 1413. In some cases, the system can use a bitmap as described herein to define the transmission time pattern of the SA subframes within the SA period. SA 1411 is the reference SA subframe for the $SFN_{start\ time}$ and $subframe_{start\ time}$. In subsequent frames, a first D2D transmission period 1420 is defined and a second D2D transmission period 1430 is defined.

The transmission pattern of each D2D data transmission burst can be signaled using similar methods as described for the signaling of retransmission pattern in Method 1, by replacing "retransmission pattern" with "transmission pattern" which also includes the first transmission of the transport block. Assuming D2D UEs are configured by the higher layer (e.g. RRC) a set of transmission time pattern where each pattern is labeled with an index, the signaling in the SA grant and the corresponding SA can indicate the transmission time pattern index. The set of transmission time patterns can have default values in the absence of higher layer signaling. The set of transmission time patterns can also be predefined. An example is shown in Table 4 above for a 2-bit field indicating up to 4 transmission time patterns. Each higher layer configured transmission pattern can be a bitmap marking the subframes within the set of subframes reserved for D2D communications for D2D retransmissions. The size of the bitmap can be the number of D2D subframes in between two adjacent D2D data transmission burst or a smaller number. Bit value of one can be used to indicate that the subframe is used for D2D transmission/retransmission, e.g., assuming bitmap length of 4 bits, a bitmap of 1101 indicates that the first D2D subframe is used for the first transmission of a D2D transport block, the second and the fourth D2D subframes are used for the 1st and 2nd retransmissions of the transport block, respectively.

As an example of the transmission time pattern construction, the patterns can be defined according to rows or columns of a Walsh matrice of order K, e.g. K=4, 8, etc, and its function. A Walsh matrix of order 8 is shown below.

$$W(8) = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

With K=8, a set of transmission time patterns can be constructed by taking the rows of the W(8) matrix, except the first row, and also their bit-wise inversion. 14 retransmission time patterns can be constructed this way as shown in Table 8, below, where 0 indicates no transmission and 1 indicates transmission. Table 8 illustrates transmission time patterns constructed using a Walsh matrix of order 8.

TABLE 8

| Transmission time pattern index | Transmission time pattern |
|---|---|
| 0 | 1 0 1 0 1 0 1 0 |
| 1 | 1 1 0 0 1 1 0 0 |
| 2 | 1 0 0 1 1 0 0 1 |
| 3 | 1 1 1 1 0 0 0 0 |
| 4 | 1 0 1 0 0 1 0 1 |
| 5 | 1 1 0 0 0 0 1 1 |
| 6 | 1 0 0 1 0 1 1 0 |
| 7 | 0 1 0 1 0 1 0 1 |
| 8 | 0 0 1 1 0 0 1 1 |
| 9 | 0 1 1 0 0 1 1 0 |
| 10 | 0 0 0 0 1 1 1 1 |
| 11 | 0 1 0 1 1 0 1 0 |
| 12 | 0 0 1 1 1 1 0 0 |
| 13 | 0 1 1 0 1 0 0 1 |

In this example, there are 4 transmission opportunities for each pattern (1 first transmission and 3 retransmissions). 4 bits can be used to signal the D2D data transmission time pattern in SA grant and SA. The D2D data transmission time pattern can also be implicitly indicated by the SA location, e.g. frequency location (PRB index) of the first SA transmission. One advantage is that explicit signaling in SA grant and SA is not needed. In this example, the frequency location of the first SA location can also indicate the SA transmission time pattern.

In another example, the D2D data transmission or D2D data burst periodicity may be independently configured from the periodicity of the scheduling assignment. For example, the period between SA transmissions and new data transmissions may be larger than the data transmission period to accommodate different SA periods and variable amounts of cellular time resources multiplexed with D2D subframes in the overall LTE frame structure. Alternatively the period between SA transmissions and the new data transmission period may be shorter to accommodate larger data transmission periods and more infrequency data traffic, while minimizing the delay between receiving the control message (e.g. SA) and the start of the first data transmission.

To support these different offsets for SA and data periodicities, and new parameter saDataOffset can be used in addition to d2dDataPeriodicity and d2dDataBurstPeriodicity. This parameter may be signaled independently of the D2D data periodicity, (pre)configured by higher layers, fixed in the specification, or may be jointly signaled as shown in Table 9 below. saDataOffset defines the time offset between the beginning of the reference SA subframe and the first D2D transport block.

Figure 15:
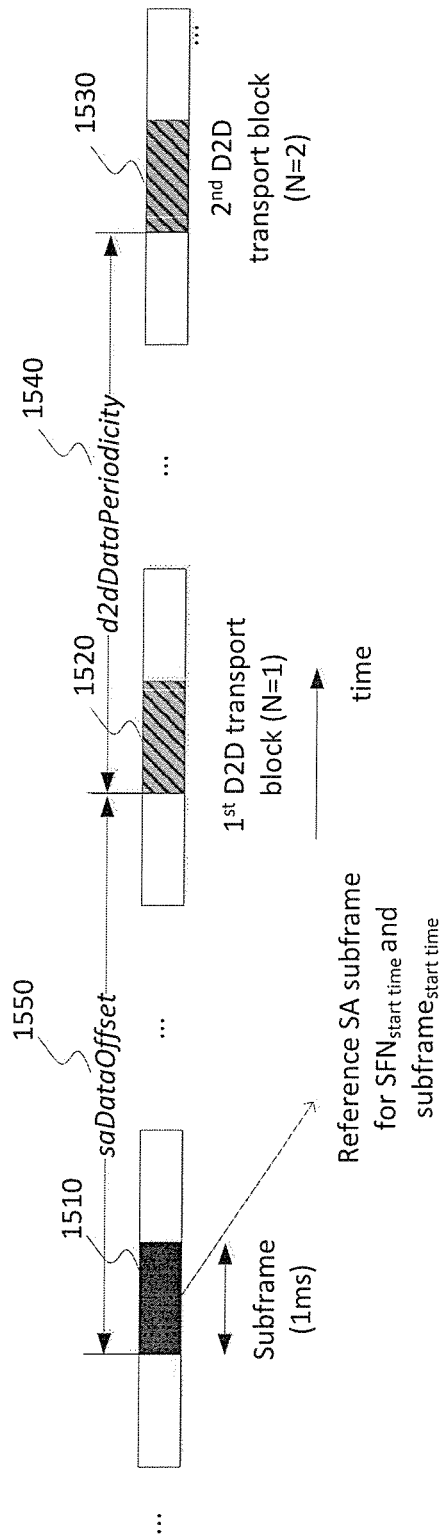
FIG. 15 illustrates a time location of a new D2D transport block in accordance with disclosed embodiments.

FIG. 15 illustrates a time location of an $N^{th}$ new D2D transport block, in accordance with disclosed embodiments. This figure illustrates that each reference subframe or D2D transport block is located at a predetermined time location in the frame during the D2D data period, denoted d2dDataPeriodicity 1540. In this example, in a first D2D data period, a reference SA subframe 1510 is transmitted for the $SFN_{start\ time}$ and $subframe_{start\ time}$. saDataOffset 1550 defines the time offset between reference SA subframe 1510 and a first D2D transport block 1020 (N=1) that is subsequently transmitted, followed by a second D2D transport block 1030 (N=2) that transmitted according to the d2dDataPeriocity 1540.

Table 9 illustrates an example of time resource periodicity indicator in SA grant and SA.

TABLE 9

| Time resource periodicity indicator | SA offset (subframes or miliseconds) | D2D data periodicity (subframes or miliseconds) |
|---|---|---|
| 0000 | 10 | 10 |
| 0001 | 10 | 20 |
| 0010 | 10 | 30 |
| 0011 | 10 | 40 |
| 0100 | 20 | 20 |
| 0101 | 20 | 40 |
| 0110 | 40 | 20 |
| 0111 | 40 | 40 |
| 1000 | 80 | 40 |
| 1001 | 80 | 80 |
| 1010-1111 | reserved | reserved |

In second disclosed embodiment can specifically allocated D2D data frequency locations. The allocation of frequency resources may also be configured and indicated by the network.

For example, in some embodiments, the eNB can indicate to a D2D UE transmitter two separate frequency domain resources, namely a first set of frequency domain resources for control/SA transmissions, and a second set of frequency domain resources for transmissions of D2D transport blocks or data.

The control information of the frequency domain resources can be included in an SA grant. After the D2D transmitter UE has received the SA grant, the D2D transmitter UE transmits the SA on the first set of indicated resources. In addition the UE can indicate the second set of frequency resources in its SA transmission. The D2D transmitter UE then transmits D2D transport blocks according to the second set of frequency resources. The D2D receiving UE obtains the D2D transport blocks according to the second set of frequency resources and can continue D2D communications using these resources.

Various embodiments can employ fixed frequency granularity in allocating frequency resources for D2D communications. The frequency granularity for D2D broadcast communication may be limited to a few fixed values, especially in the case of distributed resource allocation utilized in out-of-network deployments where coordination is limited and only a few traffic types typically utilized (e.g. VoIP). In this case the frequency resource signaling may provide a fixed granularity through explicit signaling. The minimum granularity may be expressed as a D2D resource block (DRB) where a DRB may correspond to one or more LTE RBs.

In some embodiments using fixed frequency granularity, the DRB assignment information includes a bitmap indicating the D2D Resource Block Groups (DRBGs) that are allocated to the scheduled UE where a DRBG is a set of consecutive localized DRBs. The DRBG size (P) may be a function of the system bandwidth, (pre)configured by higher layers, signalled as part of the scheduling assignment, or fixed in the specification. The total number of DRBGs ($N_{DRBG}$) for the UL system bandwidth of $N_{DRB}^{UL}$ is given by $N_{DRBG} = \lceil N_{DRB}^{UL}/P \rceil$ where $\lfloor N_{DRB}^{UL}/P \rfloor$ of the DRBGs are of size P and if $N_{DRB}^{UL}$ mod P>0 then one of the DRBGs is of size $N_{DRB}^{UL} - P \cdot \lfloor N_{DRB}^{UL}/P \rfloor$. The bitmap is of size $N_{DRBG}$ bits with one bitmap bit per DRBG such that each DRBG is addressable.

In one example using fixed frequency granularity, the DRBGs may be indexed in the order of increasing frequency and non-increasing DRBG sizes starting at the lowest frequency. In this case, the order of DRBG to bitmap bit mapping is in such way that DRBG 0 to DRBG $N_{DRBG}-1$ are mapped to MSB to LSB of the bitmap. The DRBG is allocated to the UE if the corresponding bit value in the bitmap is 1, the DRBG is not allocated to the UE otherwise. Alternative mappings may also be considered well, reversing the order of the mapping described above.

In another example using fixed frequency granularity, the resource block assignment field consists of a D2D resource indication value (DRIV) corresponding to a starting D2D resource block ($DRB_{start=0}$, $N_{DRB}^{step}$, $2N_{DRB}^{step}$, ..., $(\lceil N_{DRB}^{UL}/N_{DRB}^{step} \rceil-1)N_{DRB}^{step}$) and a length in terms of contiguously allocated D2D resource blocks ($L_{DRBs} = N_{DRB}^{step}$, $2N_{DRB}^{step}$, ..., $\lceil N_{DRB}^{UL}/N_{DRB}^{step} \rceil \cdot N_{DRB}^{step}$).

The resource indication value is defined by:

if $(L'_{DRBs} - 1) \le \lfloor N'_{DRB}^{UL}/2 \rfloor$ then
  DRIV = $N'_{DRB}^{UL} (L'_{DRBs} - 1)$ + $DRB'_{start}$
else
  DRIV = $N'_{DRB}^{UL} (N'_{DRB}^{UL} - L'_{DRB} + 1) + (N'_{DRB}^{UL} - 1 - DRB'_{start})$
where $L'_{DRBs} = L_{DRBs}/N_{DRB}^{step}$, $DRB'_{start} = DRB_{start}/N_{DRB}^{step}$ and $N'_{DRB}^{UL} = \lceil N_{DRB}^{UL}/N_{DRB}^{step} \rceil$.

Here, $L'_{DRBs} \ge 1$ and shall not exceed $N'_{DRB}^{UL} - DRB'_{start}$.

Various embodiments can employ variable frequency granularity. The resource allocation information for frequency resources may utilized localized RB allocation since the D2D data transmission are based on the PUSCH structure. With this baseline, the SA can indicate to the Rx UEs a starting resource block ($DRB_{START}$) and a length of contiguously allocated DRBs($L_{DRBs} \ge 1$) based on a D2D resource indication value (DRIV). The DRIV can be defined as:

if $(L_{DRBs} - 1) \le \lfloor N_{DRB}^{UL}/2 \rfloor$ then
  DRIV = $N_{DRB}^{UL} (L_{DRBs} - 1) + DRB_{START}$
else
  DRIV = $N_{DRB}^{UL} (N_{DRB}^{UL} - L_{DRBs} + 1) + (N_{DRB}^{UL} - 1 - DRB_{START})$
where $L_{DRBs} \ge 1$.

Various embodiments can employ a nested frequency allocation method. In another multiple frequency granularities can be signalled by the SA by using a nested allocation approach. For example, a DRB may consist of 1, 2, or 3 DRBs to accommodate different traffic types or number of concurrent D2D transmissions. In one example of nested allocation, a tier and a shift may be indicated. The tier indicates the number of consecutives DRBs, while the shift indicates a frequency offset similar to those described in other alternatives.

Figure 16:
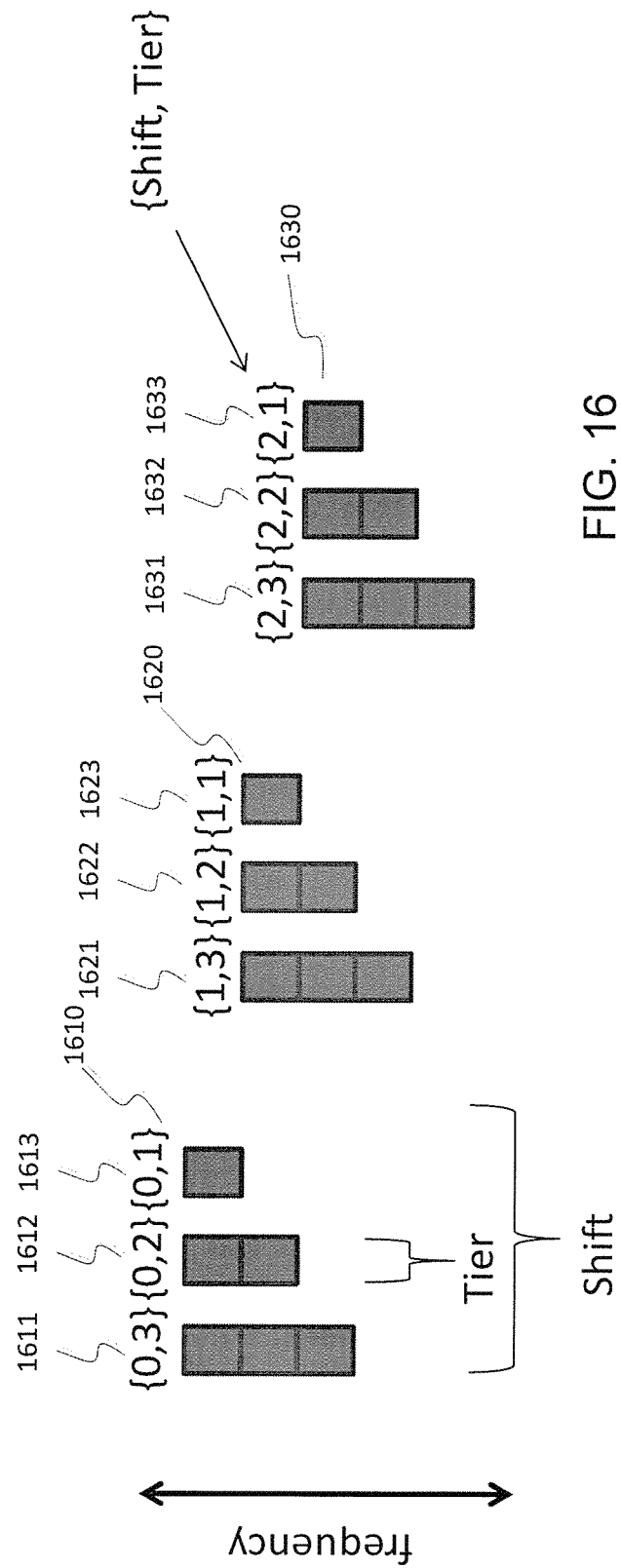
FIG. 16 illustrates an example of nested frequency allocation with a 3-tier granularity in accordance with an embodiment of this disclosure.

FIG. 16 illustrates an example of nested frequency allocation with a 3-tier granularity (1-3 RB) and 3 level-shift (1 RB). This figure shows three DRBs 1610, 1620 and 1630, each having nested DRBs with an associated shift value and tier value. DRB 1610 includes nested DRB 1611 with shift=0 and tier=3. DRB 1610 includes nested DRB 1611 with shift=0 and tier=3. DRB 1610 also includes nested DRB 1612 with shift=0 and tier=2. DRB 1620 also includes nested DRB 1613 with shift=0 and tier=1.

DRB 1620 includes nested DRB 1621 with shift=1 and tier=3. DRB 1620 includes nested DRB 1622 with shift=1 and tier=2. DRB 1620 includes nested DRB 1623 with shift=1 and tier=1.

DRB 1630 includes nested DRB 1631 with shift=2 and tier=3. DRB 1630 includes nested DRB 1632 with shift=2 and tier=2. DRB 1630 includes nested DRB 1633 with shift=2 and tier=1.

Some cases can use an implicit allocation method for frequency allocation. The resource for the data transmission can be explicitly indicated by the contents of the SA or implicitly indicated by the SA resource itself. This may be beneficial to avoid resource collisions especially in case of out-of-network operation. The SA and data frequency allocations may be implicitly linked.

In some cases using implicit allocation, the frequency location of the SA may directly correspond to the frequency location of the data DRBs or may correspond the location of the SA plus an offset. The offset may be additionally signaled by the SA, may be (pre)configured by higher layers, or fixed in the specification.

In other cases using implicit application, the system can include a field in the SA for explicit indication of the data RPTs. However certain values of the field can be reserved for implicit data resource indication based on the frequency location of the corresponding SA. For example if 5 bits are used for the frequency indication field, the value '00000' may be reserved to indicate implicit data resource allocation based on the frequency location of the SA.

Some disclosed embodiments use a combination of SA and data indication. For allocation by the eNB, the SA frequency resources may also be allocated in addition to the D2D data transport block resources by physical layer signaling (e.g. DCI) or by higher layer configuration. In this case frequency allocation formats CAN be defined to support SA and data frequency allocations.

In some cases using SA and data indication, the system can use separate SA and data indication. Separate SA and data indications may be provided in the eNB grant according to any of the previously described alternatives. In one example. the format used for SA and data frequency allocations are identical. In another example, the format may be different for the SA and data grant. For example, when using variable frequency granularity, the SA may utilize fewer bits than the data allocation since the SA may be restricted to only one or a few values of supported contiguous DRBs or offsets.

For example, for N_UL=25 DRBs, 8 bits may be used to indicated the DRIV. However, the SA may be restricted to only 1 or 2 DRBs. In this case only 6 bits are required to be signaled in the eNB grant.

In some cases using SA and data indication, the system can use joint SA and data indication. In such cases, a single format may be used to jointly indicated SA and data resources within the grant signaling. The format can be defined in such a way that the D2D Tx UE knows how to interpret the allocation field to differentiate between the SA and data allocations.

In one example using variable frequency granularity, the DRIV may be shared between the SA and data with a fixed number of bits, and the number of consecutive DRBs and the starting offset are common for the SA and data. In another example using variable frequency granularity, the DRIV may be constructed using a new equation to correspond to two sets of consecutive DRBs and two sets of shifts (one for the SA and one for the data). As another example, the number of consecutive DRBs or the offset may be common for the SA and data, with the other parameter requiring two indications for the SA and data respectively. In other cases a virtual DRIV (vDRIV) may be introduced which maps SA+Data frequency allocations to the DRIV equation described above using variable frequency granularity. This mapping may be (pre)configured by higher layers or fixed in the specification.

Example: For N_UL=25 DRBs, the total number of bits in the DRV may be the same as if the SA and data were indicated independently, however the SA may restrict the LSB to a range of (1,2) and the data LSB may be restricted to a range of (1-10).

Various embodiments can also use joint D2D data time/frequency allocations. While the separate time and frequency allocations as described above can be used, the above bit fields and mapping tables may be constructed to allow for joint time/frequency allocation. That is, the SA cam includes at least one bit field or mapping table for allocating both time-domain resources and frequency-domain resources This can be beneficial in the case that only a subset of time/frequency allocations are likely to be utilized by a D2D system and joint indication may reduce the amount of necessary control overhead, improving the efficiency of the D2D air interface. For example the time/frequency fields may map to an index which corresponds to a pattern of DRBs in D2D subframes similar to Table 5. These patterns may be explicitly signaled by the SA, (pre) configured by higher layers, or fixed in a specification.

Various embodiments can also use a D2D data time resource pattern configuration. As described above with respect to time resource allocation, the time resource allocation for D2D data and any retransmissions (of for control) may be indicated as a transmission pattern. For example a bitmap may correspond to a set of valid D2D subframes and a '1' in the bitmap indicates a transmission opportunity, while a '0' in the bitmap indicates a transmission is not performed by the Tx UE.

To reduce the overhead of the control signaling each valid time allocation pattern may be expressed as an index of a table containing the patterns. A transmitting UE may signal the index as part of a D2D control message, allowing the receiving the UEs to know which time instances a D2D data transmission may be received. In addition, in case of D2D operation within network coverage, the time allocation pattern for either the D2D control or D2D data transmissions may be indicated or configured by the eNB. In this case a control message from the eNB using a DCI format or contained in a RRC message may be utilized.

In one example the T-RPT table may correspond to patterns which are all of equal length (e.g. 8 bits). In another example the T-RPT table may correspond to patterns which have different lengths to support different transmission periodicities or multiple D2D resource configurations. Table 10 illustrates an example T-RPT table with two pattern length:

TABLE 10

| T-RPT index | Transmission time pattern |
| --- | --- |
| 0 | 1 0 1 0 1 0 1 0 |
| 1 | 1 1 0 0 1 1 0 0 |
| 2 | 1 0 0 1 1 0 0 1 |
| 3 | 1 1 1 1 0 0 0 0 |
| 4 | 1 0 1 0 |
| 5 | 1 1 0 0 |
| 6 | 1 0 0 1 |
| 7 | 0 1 0 1 |
| 8 | 0 0 1 1 |

In another example, the length and possibly the values of the transmission patterns may be the same for multiple indices, however the mapping corresponds to different mapping to D2D subframes. For example index '0' may correspond to pattern 1010 which directly maps to available D2D subframes 1, 2, 3, 4 in a resource pool, while index '1' may correspond to pattern 1010 but the mapping is to available D2D subframes 1, 3, 5, 7. The mapping can be predefined in a specification, for example, preconfigured, or indicated as part of the table configuration signaling from the network. In another example the mapping may be dependent on the duplex configuration. For example the pattern 0101 may have a different interpretation depending on if FDD or a given TDD configuration is utilized on the D2D carrier.

In another example the T-RPT table index may map to a pattern bitmap as well as a number of repetitions of the pattern N and/or a pattern offset T. The number of repetitions may correspond to the number of transmissions of a new data transmission including any retransmissions. The T-RPT is repeated N times in this case. The T-RPT offset corresponds to an offset from the a reference subframe (e.g. first or last SA transmission or starting or ending location of the SA or data resource pool). For example index '0' may correspond to pattern 1010 with N=4 and an offset of T=2 subframes, while index '0' may correspond to pattern 1010 with N=4 and an offset of T=4. In addition, N multiple offsets may be mapped to an index, where each value of the offset corresponds to a repetition of the T-RPT.

In some cases, all possible time resource patterns for transmission (T-RPT) can be included in a table (T-RPT Table), with each entry of the table corresponding to a T-RPT index and a T-RPT definition (e.g. bitmap or offset and duration parameters). The table may be preconfigured, fixed in a specification, or configured by the network.

In other cases, the number of possible T-RPT bitmaps may be greater than the size of the table and the index range may not be able to map to all possible T-RPT values.

In some cases, multiple T-RPT tables can be employed. The different T-RPT values may be included in multiple T-RPT tables. For example a set of T-RPT values corresponding to design type (e.g. based on Walsh matrices or generated based on a combinatorial equation) may be included in one or more separate tables. In another example the table may correspond to one or multiple duplex types (e.g. FDD and/or TDD). Further in the case of TDD, multiple tables may correspond to different TDD configurations. To configure a T-RPT table, a Table index may be signaled if the tables are predefined and known at the UE, otherwise the table contents may be directly preconfigured or signaled to the UE by the network.

In addition, to allow the receiving UEs to unambiguously interpret the T-RPT index signaled by a transmitting UE, the control signaling may provide a table ID as well as a T-RPT index. Alternatively the network may configure the table ID which is valid for UEs through physical layer signaling (e.g. D2D DCI format) or higher layer configuration message (e.g. RRC). When configured with a table ID the UE utilizes the T-RPT index mapping based on the corresponding ID. In the case a ID is not configured, a default table ID may be utilized which is preconfigured, fixed in the specification, or configured by the network. In one example a single default table may be configured (e.g. FDD or TDD configuration 5). In another example multiple default tables may be configured where one table is applied in case of out of network operation, while in case of in-network or partial network coverage the default table corresponds to the indicated valid TDD configuration utilized by the network.

In other cases, a reconfigurable table can be used by defining a single T-RPT table. In this case the T-RPT index mapping to a T-RPT value may be configurable by the network or other D2D entity (e.g. D2D server or D2D group leader UE). In one example the entire table may be provided to a UE upon configuration/reconfiguration.

Other cases can use a partially-reconfigurable table. In another example, a subset of T-RPT table values may be reconfigured by the network or other controller entity. In one example case, any values for the entire table may be reconfigured and indicated to the UE by the network or other D2D entity in a higher layer control message. Alternatively, only a subset of the T-RPT table may be reconfigured and the T-RPT table is partitioned into a fixed region and variable region where the network or other entity may reconfigure table values. The fixed region or range of indices for the fixed region may be preconfigured, fixed in the specification, or configured by the network. In one example a parameter trptTable is signaled to a UE where trptTable contains a list containing trptIndex and a corresponding trptPattern as well as possibly fields trptRepetition and possibly one or more trptOffset fields corresponding to N and T respectively.

It should be noted that the above alternatives for configuring/reconfiguring resource allocation pattern tables may be used to implement the time/frequency allocation parameters described above.

Various embodiments address possible D2D data T-RPT mapping errors. Depending on the resource pool configuration, it is possible that after taking into account any necessary repetitions, for a given MAC PDU the number of transmission opportunities is less than the number of (pre)configured repetitions. This event is possible when the number of available D2D subframes (e.g., 1 s in the resource pool bitmap) and the value of k (number of 1 s in the pattern bitmap) of the T-RPT are small. Disclosed embodiments can ensure that, for FDD and every TDD configuration, it is possible to have at least one valid resource pool and T-RPT combination. Therefore, since the network has the ability to control the configuration, it should be an error case for the network to not configure enough 1s such that it is not possible to make at least 4 transmissions of a MAC PDU.

A UE may not expect such as misconfiguration. In this case the UE shall expect a resource pool configuration such that the (pre)configured minimum transmissions of a MAC PDU is always possible. The UE behavior in case of this misconfiguration can vary based on implementation, in various embodiments.

In one implementation, a UE may not transmit any MAC PDU transmissions less than the minimum number (pre) configured in case of such a misconfiguration.

In a second implementation, a UE may transmit the number of MAC PDU transmissions indicated by the resource pool even if it is less than the minimum number (pre)configured in case of such a misconfiguration. The remaining portion of the T-RPT is then truncated from a (pre)configured location and not utilized for transmissions.

In a third implementation, a UE may transmit the number of MAC PDU transmissions indicated by the resource pool even if it is less than the minimum number (pre)configured in case of such a misconfiguration. The remaining portion of the T-RPT is chosen by the UE depending on the traffic type or randomly selected.

Various embodiments can also implement a D2D data T-RPT selection. The transmitting UE may select T-RPT for data independently from the SA resource selection, with equal probability out of the available and relevant T-RPTs. Additionally the only possible value of the number of transmissions of a given D2D communication MAC PDU may be (pre)configured or fixed in the specification. Depending on the resource pool (pre)configuration "relevant T-RPT" should correspond to a T-RPT pattern which allows for the transmission of at least four MAC PDUs taking into account any T-RPT repetitions. Preferably, but not necessarily, the appropriate T-RPT selection from the available relevant T-RPTs (as defined above) to meet any traffic type requirements (e.g. VoIP delay) is left to UE implementation. For example, the UE may select a subset of relevant T-RPT patterns based on the required periodicity between MAC PDUs depending on traffic type/QoS requirements. In addition, spectrum sensing (physical or virtual) may be applied to select a subset of T-RPTs which would provide better performance for subsequent data transmissions. The mapping of T-RPTs to different traffic types/QoS classes may be fixed in the specification, preconfigured, or indicated by higher layer signaling. For example a T-RPT pattern with k=1 may correspond to VoIP traffic, while a T-RPT pattern with k=8 may correspond to high data rate traffic such as video streaming.

Various embodiments can also use D2D data T-RPT repetition. As discussed described above, the length-N T-RPT bitmap can be mapped to the available D2D data subframes within a data scheduling period depending on the D2D communication mode. For example, in case of eNB allocated resources (e.g. Mode 1), the mapping corresponds to contiguous UL subframes. In another example, for UE selected allocation (e.g. Mode 2) the mapping corresponds to the 1s indicated by the data resource pool.

In case a UE is aware of a data resource pool, the repetition of the T-RPT pattern is straightforward due to the ability for the repetition of the bitmap for some portion or the entire duration of the pool. However if there is no resource pool configured, the repetition of the T-RPT pattern requires a different behavior. For example, if a T-RPT bitmap contains a number of 1's less than 4, the UE for Mode 2 would be able to repeat the bitmap for the duration of the scheduling cycle. Considering that Mode 1 and Mode 2 data transmissions may coexist, similar behavior for Mode 1 would be possible, depending on how the T-RPT repetition is handled.

In some cases, there can be an implicit T-RPT repetition. In such cases a T-RPT is repeated until a certain instance of another pool. For example the T-RPT may repeat until the start of the next SA or data resource pool. One disadvantage of implicit T-RPT repetition occurs when implemented in embodiments where T-RPT) are included in a table (T-RPT Table), with each entry of the table corresponding to a T-RPT index and a T-RPT definition or where the number of possible T-RPT bitmaps is greater than the size of the table and the index range so that the system cannot map to all possible T-RPT values. In these cases, the implicit T-RPT repetition removes the network flexibility to control the scheduling of D2D and cellular traffic. For example if the period between SA resource pools is large, the number of UL subframes which would need to be reserved for Mode 1 T-RPT repetition could be very large (especially for small values of k) resulting in an unacceptable degradation of the cellular traffic.

Other cases can use Grant-based T-RPT repetition. In such cases, the T-RPT may repeat until the next SA or data grant is received from the serving eNB.

Other cases can use preconfigured T-RPT repetition. In such cases, a T-RPT is repeated to achieve pre-configured number of MAC PDUs transmissions. For example, for k=1, 2, 4, 8 the T-RPT bitmap would be repeated 4, 2, 1, 1 times respectively to support 1 or 2 MAC PDU transmission.

Other cases can use an explicit indication of T-RPT repetition. In these cases, there is an explicit indication of the number of T-RPT repetitions. For example, the SA/data grant DCI may contain fields for this indication. In another example, higher layer signalling is used to indicate the number of T-RPT repetitions for Mode 1. This is especially attractive since it is similar in spirit to the feature of semi-persistent scheduling which allows the network to control the duration of periodic transmissions which are of a similar nature as D2D communication transmissions since the a scheduled data T-RPT pattern is periodic until the next scheduling instance.

For example, if the number of transmissions of a MAC PDU is fixed to 4, for T-RPT patterns with k=1, the T-RPT bitmap would be configured by RRC signaling to be repeated 4 times to support 1 MAC PDU transmission, while in another example, for k=8 the T-RPT bitmap would be configured by RRC signaling to be repeated once to support 1 or 2 MAC PDU transmission. This allows the network to efficiently utilize UL subframes for both cellular and D2D transmissions while ensuring that 4 transmissions of a MAC PDU are supported for different values of k.

Figure 17:
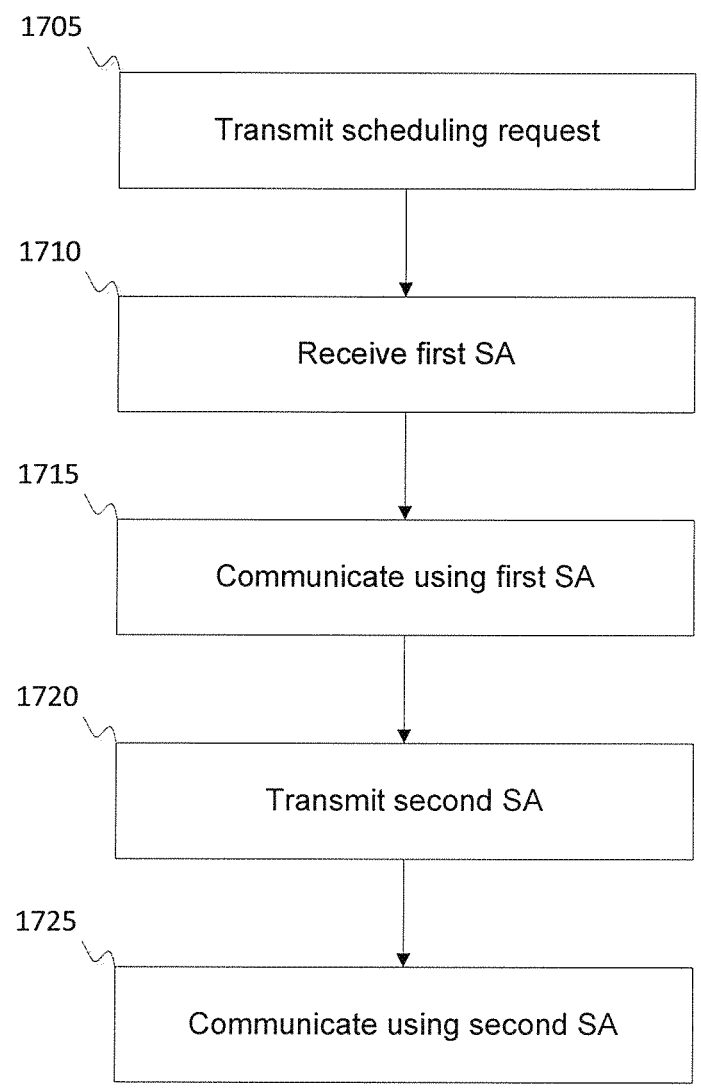
FIG. 17 illustrates a flowchart of a process in accordance with disclosed embodiments.

FIG. 17 illustrates a flowchart of a process in accordance with disclosed embodiments that may be performed, for example, by a UE in a hybrid communication network. Those of skill in the art will recognize that complimentary processes are performed by other devices in the hybrid communication network. For example, where the UE receives a specific communication from an eNB, it is understood that the eNB has performed the complementary action of transmitting that communication. Further, any of the various embodiments, alternatives, implementations, or other features described above may be incorporated into the process of FIG. 17 within the scope of the disclosure.

A first UE transmits a scheduling request to a first eNB (1705). The scheduling request can specify that the UE is capable of device-to-device (D2D) communications.

The first UE receives a first scheduling assignment (SA) from the first eNB (1710). The first SA indicates time-domain resources to be used by the first UE for D2D communications with the first eNB.

The first UE communicates with the first eNB according to the first SA (1715).

The first UE transmits a second SA to a second UE (1720). The second SA indicates time-domain resources to be used by the second UE to communicate with the first UE.

The first UE communicates with the second UE according to the second SA (1725).

The following documents and standards descriptions are hereby incorporated into the present disclosure as if fully set forth herein:

[1] 3GPP TS 36.211 v11.2.0, "E-UTRA, Physical channels and modulation."

[2] 3GPP TS 36.212 v11.2.0, "E-UTRA, Multiplexing and Channel coding"

[3] 3GPP TS 36.213 v11.2.0, "E-UTRA, Physical Layer Procedures"

[4] 3GPP TR 36.872 V12.0.0, "Small cell enhancements for E-UTRA and E-UTRAN—Physical layer aspects"

[5] 3GPP TS 36.133 v11.7.0, "E-UTRA Requirements for support of radio resource management"

Although the present disclosure has been described with an exemplary embodiment, various changes and modifications may be suggested to one skilled in the art. It is intended that the present disclosure encompass such changes and modifications as fall within the scope of the appended claims. None of the description in the present application should be read as implying that any particular element, step, or function is an essential element which must be included in the claim scope: the scope of patented subject matter is defined only by the allowed claims. Moreover, none of these claims are intended to invoke 35 USC §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

What is claimed is:

1. A user equipment (UE) in a hybrid communication network, comprising:
   a controller; and
   a transceiver, wherein the controller is configured to cause the transceiver to:
     transmit a scheduling request to a first eNodeB (eNB), wherein the scheduling request indicates that the UE is capable of device-to-device (D2D) communications;
     receive a scheduling assignment (SA) from the first eNB, wherein the SA indicates resources to be used by a first UE for device-to-device (D2D) communications with the first eNB, wherein the SA includes a retransmission time pattern index that is associated with a retransmission time pattern indicator;

wherein the SA indicates a D2D transmission time domain pattern, including periodicity of a D2D data transmission burst, and a period of transmission and retransmission of a D2D transport block; and wherein the SA indicates a first set of frequency domain resources for control or SA transmissions, and also indicates a second set of frequency domain resources for transmissions of D2D transport blocks or data, and communicate with the first eNB according to the SA.

2. The UE of claim 1, wherein the SA indicates a first set of time domain resources for new D2D transport blocks or data, and also indicates a second set of time domain resources for retransmissions of D2D transport blocks or data.

3. The UE of claim 2, wherein the SA includes a bit field that indicates a periodicity of new D2D transport block transmissions.

4. The UE of claim 1, wherein the SA includes at least one bit field for allocating both time-domain resources and frequency-domain resources.

5. The UE of claim 1, wherein the SA includes at least one table indicating possible time resource patterns for transmission.

6. The UE of claim 1, wherein the SA implicitly indicates the resources to be used by the first UE for D2D based on a frequency location of the SA.

7. The UE of claim 1, wherein the SA includes a bit field that indicates a periodicity of new D2D transport block transmissions.

8. A method for a communications in a hybrid communication network, comprising:

transmitting, by a first user equipment (UE), a scheduling request to a first eNodeB (eNB), wherein the scheduling request indicates that the UE is capable of device-to-device (D2D) communications;

receiving, by the first UE, a scheduling assignment (SA) from the first eNB, wherein the SA indicates resources to be used by the first UE for device-to-device (D2D) communications with the first eNB, wherein the SA includes a retransmission time pattern index that is associated with a retransmission time pattern indicator;

wherein the SA indicates a D2D transmission time domain pattern, including periodicity of a D2D data transmission burst, and a period of transmission and retransmission of a D2D transport block; and wherein the SA indicates a first set of frequency domain resources for control or SA transmissions, and also indicates a second set of frequency domain resources for transmissions of D2D transport blocks or data, and communicating, by the first UE, with the first eNB according to the SA.

9. The method of claim 8, wherein the SA indicates a first set of time domain resources for new D2D transport blocks or data, and also indicates a second set of time domain resources for retransmissions of D2D transport blocks or data.

10. The method of claim 9, wherein the SA includes a bit field that indicates a periodicity of new D2D transport block transmissions.

11. The method of claim 8, wherein the SA includes at least one bit field for allocating both time-domain resources and frequency-domain resources.

12. The method of claim 8, wherein the SA includes at least one table indicating possible time resource patterns for transmission.

13. The method of claim 8, wherein the SA implicitly indicates the resources to be used by the first UE for D2D based on a frequency location of the SA.

14. The method of claim 8, wherein the SA includes a bit field that indicates a periodicity of new D2D transport block transmissions.

* * * * *